(12) United States Patent
Huang et al.

(10) Patent No.: US 12,362,812 B2
(45) Date of Patent: Jul. 15, 2025

(54) BEAM FAILURE RECOVERY RESPONSE TRANSMISSION METHOD AND MONITORING METHOD, BASE STATION AND TERMINAL

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 463 days.

(21) Appl. No.: 17/425,659

(22) PCT Filed: Jan. 20, 2020

(86) PCT No.: PCT/CN2020/073142
§ 371 (c)(1),
(2) Date: Jul. 23, 2021

(87) PCT Pub. No.: WO2020/151640
PCT Pub. Date: Jul. 30, 2020

(65) Prior Publication Data
US 2022/0094416 A1  Mar. 24, 2022

(30) Foreign Application Priority Data
Jan. 24, 2019  (CN) .......................... 201910070031.7

(51) Int. Cl.
*H04B 7/06* (2006.01)
*H04W 24/08* (2009.01)
(Continued)

(52) U.S. Cl.
CPC .......... *H04B 7/0695* (2013.01); *H04W 24/08* (2013.01); *H04W 48/20* (2013.01); *H04W 76/19* (2018.02)

(58) Field of Classification Search
CPC .... H04B 7/0695; H04B 7/088; H04B 7/0408; H04W 24/08; H04W 48/20; H04W 76/19; H04W 36/305; H04W 24/04; H04W 24/10
See application file for complete search history.

(56) References Cited

U.S. PATENT DOCUMENTS

| | | |
|---|---|---|
| 2018/0310188 A1 | 10/2018 | Stirling-Gallacher et al. |
| 2019/0229777 A1 | 7/2019 | Guan et al. |

(Continued)

FOREIGN PATENT DOCUMENTS

| | | |
|---|---|---|
| CN | 108307452 A | 7/2018 |
| CN | 108966244 A | 12/2018 |

(Continued)

OTHER PUBLICATIONS

Huawei, HiSilicon, "Beam failure recovery for Scell", R1-1813561, 3GPP TSG RAN WG1 Meeting #95, Spokane, USA, Nov. 12-16, 2018, all pages.

(Continued)

*Primary Examiner* — Habte Mered
(74) *Attorney, Agent, or Firm* — Ladas & Parry, LLP

(57) ABSTRACT

The present disclosure provides a beam failure recovery response transmission method and monitoring method, a base station and a terminal. The transmission method includes: determining at least one serving cell, from serving cells that have an association relationship with a first serving cell, as a second serving cell; and transmitting a beam failure recovery response for the first serving cell on the second serving cell.

6 Claims, 2 Drawing Sheets

```
┌─────────────────────────────────────────────────────────┐
│ determining at least one serving cell, from serving      │
│ cells that have an association relationship with a      │── 101
│ first serving cell, as a second serving cell            │
└─────────────────────────────────────────────────────────┘
                            │
                            ▼
┌─────────────────────────────────────────────────────────┐
│ transmitting a beam failure recovery response for the   │── 102
│ first serving cell on the second serving cell           │
└─────────────────────────────────────────────────────────┘
```

(51) Int. Cl.
    *H04W 48/20*     (2009.01)
    *H04W 76/19*     (2018.01)

(56) References Cited

U.S. PATENT DOCUMENTS

| | | | | |
|---|---|---|---|---|
| 2019/0349061 | A1* | 11/2019 | Cirik | H04L 1/1861 |
| 2020/0092785 | A1 | 3/2020 | Yang | |
| 2020/0170065 | A1* | 5/2020 | Xue | H04W 80/02 |
| 2020/0322031 | A1* | 10/2020 | You | H04L 5/001 |
| 2020/0413469 | A1* | 12/2020 | Wu | H04W 36/06 |
| 2021/0044344 | A1* | 2/2021 | Jiang | H04W 76/19 |
| 2021/0135818 | A1* | 5/2021 | Chen | H04L 5/0023 |
| 2021/0258062 | A1* | 8/2021 | Koskela | H04W 74/02 |

FOREIGN PATENT DOCUMENTS

| | | | | |
|---|---|---|---|---|
| CN | 109246732 | A | 1/2019 | |
| CN | 109842499 | A | 6/2019 | |
| EP | 3644649 | A1 | 4/2020 | |
| EP | 3836734 | A1 | 6/2021 | |
| WO | 2018/174806 | A1 | 9/2018 | |
| WO | 2018/202178 | A1 | 11/2018 | |
| WO | 2018204255 | A1 | 11/2018 | |
| WO | 2018/237400 | A1 | 12/2018 | |
| WO | WO-2019196118 | A1 * | 10/2019 | H04B 7/0602 |
| WO | WO-2020063126 | A1 * | 4/2020 | H04B 7/0408 |
| WO | 2020092752 | A1 | 5/2020 | |

OTHER PUBLICATIONS

Fujitsu, "Enhancements on Multi-beam Operation", R1-1900257, 3GPP TSG RAN WG1 Meeting #Ad-Hoc 1901, Taipei, Taiwan, Jan. 21-25, 2019, all pages.

First Office Action and search report from 201910070031.7, dated May 7, 2021, with English translation from Global Dossier, all pages.

First Office Action from TW app. No. 109101895, dated Dec. 8, 2021, with machine English translation from applicant, all pages.

International Search Report from PCT/CN2020/073142, dated Apr. 17, 2020, with English translation from WIPO, all pages.

Written Opinion of the International Searching Authority from PCT/CN2020/073142, dated Apr. 17, 2020, with English translation from WIPO, all pages.

International Preliminary Report on Patentability from PCT/CN2020/073142, dated Jul. 27, 2021, with English translation from WIPO, all pages.

Supplementary European Search Report for European Application No. 20744470 issued on Feb. 16, 2022.

Huawei, HiSilicon R-1810106 "Beam Failure Recovery for SCell" 3GPP TSG RAN WG1 Meeting #94bis Chengdu, China, Oct. 8-12, 2018, entire document.

Convida Wireless R1-1901206 "On Beam Failure Recovery for SCell" 3GPP TSG-RAN WG1 Ad-Hoc Meeting 1901 Taipei, Tawain. Jan. 21-25, 2019, entire document.

\* cited by examiner

BEAM FAILURE RECOVERY RESPONSE TRANSMISSION METHOD AND MONITORING METHOD, BASE STATION AND TERMINAL

CROSS-REFERENCE TO RELATED APPLICATION

The present application is the U.S. national phase of PCT Application No. PCT/CN2020/073142 filed on Jan. 20, 2020, which claims a priority to the Chinese patent application No. 201910070031.7 filed in China on Jan. 24, 2019, the disclosures of which are incorporated in their entireties by reference herein.

TECHNICAL FIELD

The present disclosure relates to the field of communication technologies, and in particular to a beam failure recovery response transmission method and monitoring method, a base station and a terminal.

BACKGROUND

As low frequency band resources become scarce, the millimeter wave frequency band has more spectrum resources and can provide greater bandwidth, and thus becomes an important frequency band for future applications of mobile communication systems. Due to its shorter wavelength, the millimeter wave frequency band has different propagation characteristics from the traditional low frequency spectrum, such as higher propagation loss, poor reflection and diffraction performance. Therefore, a larger-scale antenna array is usually adopted to form a shaped beam with greater gain to overcome propagation loss and ensure system coverage.

For millimeter wave antenna arrays, due to the shorter wavelength, a distance and an aperture between antenna elements are smaller, so that more physical antenna elements are integrated into a two-dimensional antenna array of limited size. Meanwhile, due to the limited size of the millimeter wave antenna array, considering factors such as hardware complexity, cost and power consumption, the digital beamforming method used in low frequency bands cannot be used, instead, a hybrid beamforming method that combines analog beams and limited digital ports, is usually adopted.

Specifically, for a hybrid beamforming system architecture, it is assumed that there are NT antennas at a transmission end and NR antennas at a receiving end, each antenna has a separate radio frequency (RF) channel, but there are only K digital channels, where K is less than or equal to $N_T$ and $N_R$.

For a multi-antenna array, each antenna has an independent radio frequency link channel, but shares a same digital link channel. Each radio frequency link allows independent adjustments of amplitude and phase of a transmitted signal, and a formed beam is mainly realized by adjusting the phase and amplitude of the radio frequency channel, which is called as an analog beamforming signal. In an all-digital beamforming antenna array, each antenna has an independent digital link channel, an amplitude and a phase of each signal can be controlled in the baseband.

Specifically, the analog beamforming has the following characteristics.

In the first aspect, for the analog beamforming, a signal transmitted by each antenna generally changes its phase through a phase shifter.

In the second aspect, due to limitation of device capabilities, the analog beamforming is performed on a whole bandwidth, and cannot be performed separately on some sub-bands like digital beamforming. Therefore, the analog beamforming is multiplexed in time division multiplexing (TDM) manner.

Due to the foregoing characteristics, flexibility of the analog beamforming is lower than that of the digital beamforming. However, since digital links required by an analog beamforming antenna array is much less than that required by a digital beamforming antenna array, the cost of the analog beamforming antenna array is significantly reduced when the number of antennas becomes large.

The hybrid beamforming architecture balances a flexibility of the digital beamforming and a low complexity of the analog beamforming, and has the ability to support beamforming for multiple data streams and multiple users simultaneously. Meanwhile, the complexity is also controlled within a reasonable range. Therefore, the hybrid beamforming architecture has become a widely adopted mode for millimeter wave transmission and has become the most important transmission mode for 5G NR systems.

For systems that use high-frequency band transmission, a downlink control channel (PDCCH) may adopt analog beamforming transmission to achieve higher beamforming gain and greater coverage. Radio resources used for PDCCH are semi-statically divided into multiple control resource sets (CORESET), and each CORESET includes radio resources of multiple PDCCH channels. A base station may semi-statically match one beam transmission direction for each CORESET, and different CORESETs match beams in different directions. Further, the base station may perform dynamic switching in different CORESETs, thereby realizing dynamic switching of beams. When transmitting PDCCH, the base station may select the CORESET with an appropriate beam direction according to information of a terminal. At a receiving end, the terminal performs blind detections in multiple configured CORESETs. For each candidate CORESET, the terminal uses a reception beam, which is corresponding to a transmission beam that transmits the CORESET, for reception.

However, an important challenge for high-frequency analog beamforming is that a transmission signal has a large propagation loss and a high probability of being blocked. For a blocked PDCCH, the terminal is unable to accurately obtain control information of downlink transmission, resulting in a decrease in reception performance, such as a decrease in rate, an increase in scheduling delay, and a decrease in user experience. One way to reduce the probability of signal being blocked is to configure beams in multiple directions for CORESET, so that the PDCCH channel can be transmitted in multiple directions to avoid problems of unreliable links caused by caused by being blocked in a certain direction However, the foregoing method brings a new problem that due to a limited blind detection capability of the terminal for the PDCCH channel, the number of CORESETs configured for each direction of the terminal will be reduced. For example, in the NR standard (Rel-15), each terminal is restricted to be configured with up to three CORESETs in the same activated Bandwidth Part (BWP). In theory, if an angle of transmitting beams is wide enough to cover an angular area covered by an entire serving cell, the problem of beam blocking will not occur. However, in order to obtain higher beamforming gain, a coverage angle of the beam is usually small and the beam is narrow. Therefore, considering characteristics including the limited number of CORESETs and narrow beams, in high-frequency millimeter wave communications, an angle coverage of the control channel is limited, which is easily to cause a coverage hole of the control channel, and then reliable reception of the control channel cannot be guaranteed.

If, as in LTE and other communication systems, a radio link is considered to fail and a radio link re-establishment procedure is started in a case that all downlink beams configured for a control channel fail, which may cause a waste of resources in addition to increasing the delay, because replacing a transmission beam and/or a reception beam may make receiving quality of downlink control signals meet requirements. In order to avoid such resource waste and time delay, in the NR standard, a fast and reliable beam failure detection and recovery procedure is standardized, so that the network side can quickly recover transmission process from the beam failure.

The beam failure recovery (BFR) mechanism in the related NR system can only be performed on a primary serving cell (PCell). When the terminal performs serving cell aggregation (CA), a secondary serving cell (SCell) is often configured in a high-frequency band. However, in the related art, after the terminal reports a beam failure recovery request of the primary serving cell, the base station transmits a beam failure recovery response to UE. This beam failure recovery response is transmitted on the primary serving cell. Since the primary serving cell itself has a beam failure, the terminal may not be able to detect the beam failure recovery response, which will increase the delay of the beam failure recovery procedure. In addition, there is no beam failure recovery procedure for the secondary cell in the current system.

SUMMARY

Embodiments of the present disclosure provide a beam failure recovery response transmission method and monitoring method, a base station and a terminal, which can increase a probability that a beam failure recovery response is detected, and reduce time delay of a beam failure recovery procedure.

One embodiment of the present disclosure provides a beam failure recovery response transmission method, including:

determining at least one serving cell, from serving cells that have an association relationship with a first serving cell, as a second serving cell; and transmitting a beam failure recovery response for the first serving cell on the second serving cell.

One embodiment of the present disclosure further provides a beam failure recovery response monitoring method, including:

determining at least one serving cell, from serving cells that have an association relationship with a first serving cell, as a second serving cell;

monitoring a beam failure recovery response for the first serving cell on the second serving cell.

One embodiment of the present disclosure further provides a base station, including: a first transceiver, a first memory, a first processor, and a program stored on the first memory and executable by the first processor. The first processor is configured to, determine at least one serving cell, from serving cells that have an association relationship with a first serving cell, as a second serving cell; and transmit a beam failure recovery response for the first serving cell on the second serving cell.

One embodiment of the present disclosure further provides a terminal, including: a second transceiver, a second memory, a second processor, and a program stored on the second memory and executable by the second processor. The second processor is configured to, determine at least one serving cell, from serving cells that have an association relationship with a first serving cell, as a second serving cell; monitor a beam failure recovery response for the first serving cell on the second serving cell.

One embodiment of the present disclosure further provides a base station, including:

a first determining module configured to determine at least one serving cell, from serving cells that have an association relationship with a first serving cell, as a second serving cell; and a transmission module configured to transmit a beam failure recovery response for the first serving cell on the second serving cell.

One embodiment of the present disclosure further provides a terminal, including:

a second determining module configured to determine at least one serving cell, from serving cells that have an association relationship with a first serving cell, as a second serving cell; and a monitoring module configured to monitor a beam failure recovery response for the first serving cell on the second serving cell.

One embodiment of the present disclosure further provides a computer-readable storage medium including a computer program stored thereon; wherein the computer program is executed by a processor to implement steps of the foregoing beam failure recovery response transmission method or implement steps of the foregoing beam failure recovery response monitoring method.

The embodiments of the present disclosure has the following beneficial effects.

In the embodiments of the present disclosure, the beam failure recovery response for the first serving cell is transmitted on the serving cell that has an association relationship with the first serving cell; that is, the beam failure recovery response of the first serving cell is not only transmitted on the first serving cell and but also transmitted on other serving cell that has an association relationship with the first serving cell, thereby increasing the probability that the beam failure recovery response is successfully transmitted to the terminal, and then reducing the time delay of the beam failure recovery process.

DETAILED DESCRIPTION

Figure 1:
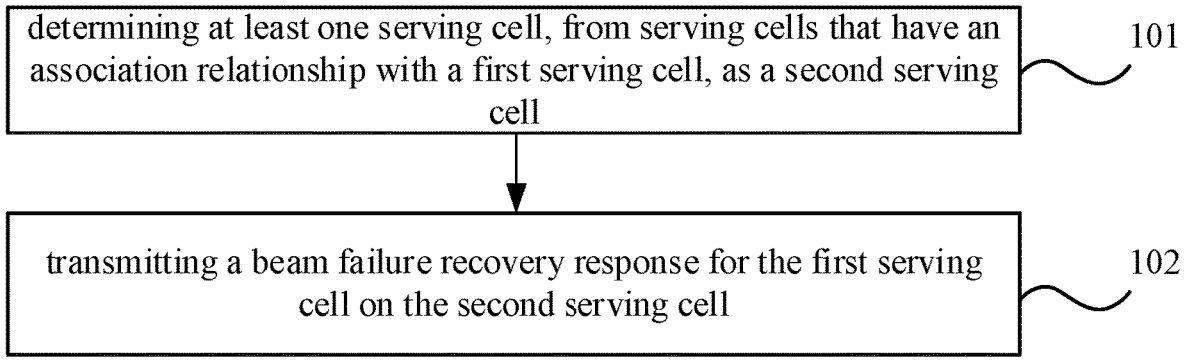
FIG. 1 is a flowchart of a beam failure recovery response transmission method according to a first embodiment of the present disclosure.

In order to make the technical problems to be solved, the technical solutions and the advantages of the present disclosure more apparent, the present disclosure will be described hereinafter in a clear and complete manner in conjunction with the drawings and embodiments. In the following description, specific details such as specific configurations and components are provided merely to aid in a thorough understanding of embodiments of the present disclosure. Accordingly, it will be apparent to those skilled in the art that various changes and modifications may be made to the embodiments described herein without departing from the scope and spirit of the present disclosure. In addition, description of known functions and configurations is omitted for clarity and brevity.

It should be understood that, "an embodiment" or "one embodiment" mentioned throughout the specification means as follows. A specific feature, structure or characteristic related with an embodiment is included by at least one embodiment in the present disclosure. Thus, "in an embodiment" or "in one embodiment" occurred throughout the whole specification does not necessarily refer to the same embodiment. In addition, these specific features, structures or characteristics may be combined in one or more embodiments in any suitable manner.

In various embodiments of the present disclosure, it should be understood that, sequence of numbers of following processes does not mean the execution order. The execution order of each process should be determined by functions and internal logics thereof, which should not make any limitation on the implementation process of the embodiments in the application.

In addition, the terms "system" and "network" in the application are usually exchanged for use.

In the embodiments of the present disclosure, it should be understood that "B corresponding to A" means that B is associated with A, and B may be determined according to A, or at least part of characteristics of B may be determined according to A, or A may be determined according to B or at least part of characteristics of A may be determined according to B. However, it should also be understood that determining B according to A does not mean that B is only determined according to A, and B may also be determined according to A and/or other information; for determining at least part of the characteristics of B according to A, or determining A according to B or determining at least part of the characteristics of A according to B, are similarly.

Technologies described in this specification are not limited to long term evolution (LTE)/LTE-Advanced (LTE-A) and NR systems, but may also be applied to various radio communications systems such as code division multiple access (CDMA), time division multiple access (TDMA), frequency division multiple access (FDMA), orthogonal frequency division multiple access (OFDMA), single-carrier frequency-division multiple access (SC-FDMA) and other systems. The terms "system" and "network" are often used interchangeably. The CDMA system may implement radio technologies such as CDMA2000 and universal terrestrial radio access (UTRA). UTRA includes wideband Code Division Multiple Access (WCDMA) and other variants of CDMA. The TDMA system may implement radio technologies such as global system for mobile communications (GSM). The OFDMA system may implement radio technologies such as ultra mobile broadband (UMB), evolved UTRA (E-UTRA), IEEE 802.11 (Wi-Fi), IEEE 802.16 (WiMAX), IEEE 1102.20, and Flash-OFDM. UTRA and E-UTRA are parts of a universal mobile telecommunications system (UMTS). LTE and more advanced LTE (such as LTE-A) are new UMTS versions using E-UTRA. NR, UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The technologies described in this specification may be used for the above systems and radio technologies, and may also be used for other systems and radio technologies. However, in the following descriptions, an NR system is described for an illustration purpose and NR terms are used in most of the following descriptions, although these technologies may also be applied to other applications than the NR system application.

In some embodiments of the present disclosure, the form of accessing network is not limited, and may include accessing network by a macro base station, a pico base station, a Node B (also referred to as 3G mobile base station), an enhanced base station (eNB), a Femto eNB (or a Home eNode B, or a Home eNB, or HeNB), a relay station, an access point (AP), a remote radio unit (RRU), a remote radio head (RRH). The base station may be a base station of 5G and later versions (for example, gNB, 5G NR NB, etc.), or a base station in other communication systems (for example, eNB, WLAN access point, or other access point, etc.). The base station may be referred as a node B, an evolved node B (eNB), an access point, a base transceiver station (BTS), a radio base station, a radio transceiver, a basic service set (BSS), an extended service set (ESS), a home node B, a home evolved node B, a WLAN access point, a WiFi node or some other appropriate terms in the field. As long as the same technical effect is achieved, the base station is not limited to specific technical vocabulary. It should be noted that in some embodiments of the present disclosure, only the base station in the NR system is taken as an example, but the specific type of the base station is not limited. A user terminal may be a mobile phone (or cell phone), or other devices capable of transmitting or receiving radio signals, including: a user equipment, a personal digital assistants (PDA), a wireless modem, a wireless communication device, a handheld device, a laptop computer, a cordless phone, a wireless local loop (WLL) station, a customer premise equipment (CPE) that can convert mobile signals into WiFi signals, or a mobile smart hotspot, smart home appliances, or other devices that can spontaneously communicate with mobile communication networks without human operation.

Embodiments of the present disclosure provide a beam failure recovery response transmission method and monitoring method, a base station and a terminal, which can increase a probability that a beam failure recovery response is detected, and reduce time delay of the beam failure recovery procedure.

First Embodiment

As shown in FIG. 1, one embodiment of the present disclosure provides a beam failure recovery response transmission method, which specifically includes the following steps.

Step 101: determining at least one serving cell, from serving cells that have an association relationship with a first serving cell, as a second serving cell.

One serving cell having an association relationship with the first serving cell, indicates that the one serving cell can be used to transmit a beam failure recovery response of the first serving cell, that is, the one serving cell is one of candidate serving cells used to transmit the beam failure recovery response of the first serving cell. In other words, the one serving cell can be used to transmit the beam failure recovery response of the first serving cell, but the one serving cell is not necessarily used to transmit the beam failure recovery response of the first serving cell.

Specifically, the association relationship may be an association relationship directly associated with the first serving cell, or may be a relationship indirectly associated with the first serving cell.

Optionally, the association relationship includes a first association relationship directly associated with the first serving cell and/or a second association relationship associated with a new candidate beam of the first serving cell reported by the terminal to the base station. That is, one serving cell may be directly associated with the first serving cell, or one serving cell may be associated with a new candidate beam of the first serving cell, thereby achieving an indirect association with the first serving cell.

One serving cell directly having a first association relationship with the first serving cell, indicates that the one serving cell can be used to transmit a beam failure recovery response of the first serving cell, that is, the one serving cell is one of candidate serving cells used to transmit the beam failure recovery response of the first serving cell. In other words, the one serving cell can be used to transmit the beam failure recovery response of the first serving cell, but the one serving cell is not necessarily used to transmit the beam failure recovery response of the first serving cell.

In addition, one serving cell having a second association relationship with the new candidate beam of the first serving cell, indicates that the one serving cell is a cell that is corresponding to the new candidate beam and can be used to transmit the beam failure recovery response of the first serving cell. The one serving cell is one of candidate serving cells used to transmit the beam failure recovery response of the first serving cell. The one serving cell can be used to transmit the beam failure recovery response of the first serving cell, but the one serving cell is not necessarily used to transmit the beam failure recovery response of the first serving cell.

Optionally, one serving cell that has an association relationship with the first serving cell is configured by the base station or predefined.

Specifically, the base station may configure a cell for the terminal to receive a beam failure recovery response of a cell (i.e., serving cell, or carrier) through signaling. For the convenience of description, one cell used for receiving the beam failure recovery response of a cell is referred as a response cell. Specific configuration modes of the response cell are as follows.

Mode 1: the base station configures a response cell for each cell. For example, the base station configures an identifier of a response cell for a beam failure recovery of each cell.

Mode 2: the base station configures response cells used to receive beam failure recovery responses of cells, and these response cells are applicable to all cells.

Mode 3: the base station indicates a response cell corresponding to each cell to the terminal through indication signaling. The terminal determines a response cell corresponding to a cell based on the indication signaling.

Optionally, an association of one serving cell with a new candidate beam of the first serving cell reported by the terminal to the base station, may be implemented in the following manner.

When configuring a candidate beam for beam failure recovery for the terminal, the base station may configure an associated serving cell for the candidate beam. Then, when the terminal reports a new candidate beam to the base station, one serving cell associated with the new candidate beam is a serving cell that has an association relationship with the first serving cell. Optionally, the base station may configure the terminal with a candidate beam for beam failure recovery of the first serving cell by configuring, for the terminal, a search space for beam failure recovery of the first serving cell, where the search space is associated with one or more CORESETs. Each CORESET is implemented as being associated with a reference signal used to represent its transmission beam. At this point, a serving cell where the CORESET is located, can be regarded as being associated with the first serving cell.

Optionally, a pre-defined serving cell that has an association relationship with the first serving cell, is a serving cell currently in an active state.

Optionally, a pre-defined serving cell that has an association relationship with the first serving cell, is a serving cell where the terminal reports a beam failure event of the first serving cell to the base station.

Optionally, a pre-defined serving cell that has an association relationship with the first serving cell, is a serving cell where the terminal reports a new candidate beam of the first serving cell to the base station.

Optionally, a pre-defined serving cell that has an association relationship with the first serving cell, is a serving cell that has a downlink in a frequency band where the first serving cell is located.

Optionally, a pre-defined serving cell that has an association relationship with the first serving cell, is a serving cell corresponding to a new candidate beam of the first serving cell reported by the terminal to the base station. For example, the base station configures, for candidate beams used for beam failure recovery of the first serving cell, serving cells for transmitting beam failure recovery responses; and these serving cells may be considered as serving cells corresponding to the candidate beams. Then, one serving cell corresponding to the new candidate beam of the first serving cell reported by the terminal to the base station, is a serving cell, which is corresponding to the new candidate beam of the first serving cell reported by the terminal to the base station and is used for transmitting a beam failure recovery response.

Optionally, a pre-defined serving cell that has an association relationship with the first serving cell, includes the first serving cell.

Optionally, a pre-defined serving cell that has an association relationship with the first serving cell includes one or more of a serving cell currently in an active state, a serving cell where the terminal reports a beam failure event of the first serving cell to the base station, a serving cell where the terminal reports a new candidate beam of the first serving cell to the base station, a serving cell corresponding to a new candidate beam of the first serving cell reported by the terminal to the base station, and a serving cell that has a downlink in a frequency band where the first serving cell is located.

When the first serving cell is a secondary serving cell, a pre-defined serving cell that has an association relationship with the first serving cell may also include a primary serving cell.

Optionally, all cells that can transmit PDCCH are cells that have an association relationship with the first serving cell.

Step 102: transmitting a beam failure recovery response for the first serving cell on the second serving cell.

Optionally, the determining at least one serving cell, from serving cells that have an association relationship with a first serving cell, as a second serving cell, includes:

selecting a first-type serving cell and/or a second-type serving cell, from the serving cells that have the association relationship with the first serving cell, as the second serving cell;

or, taking each serving cell that has an association relationship with the first serving cell as the second serving cell;

where the first-type serving cell is not in a beam failure recovery process; the second-type serving cell is in a beam failure recovery process, and the new candidate beam of the first serving cell reported by the terminal to the base station is not in failure beams of the second-type serving cell reported by the terminal to the base station.

That is, at least one first-type serving cell may be selected as the second serving cell from the serving cells associated with the first serving cell, or, at least one second-type serving cell may be selected as the second serving cell from the serving cells associated with the first serving cell, at least one first-type serving cell and at least one second-type serving cell may be selected as the second serving cells from the serving cells associated with the first serving cell, or, all serving cells associated with the first serving cell are used as the second serving cells.

Since the first-type serving cell is not in a beam failure recovery process, transmission of the beam failure recovery response for the first serving cell on the first-type serving cell can increase a probability that the beam failure recovery response is monitored, thereby reducing time delay of beam failure recovery.

Although the second-type serving cell is in a beam failure recovery process, and the new candidate beam of the first serving cell reported by the terminal to the base station is not in failure beams of the second-type serving cell reported by the terminal to the base station, thus, transmission of the beam failure recovery response for the first serving cell on the second-type serving cell enables the beam failure recovery response to be transmitted on beams without failure, thereby increasing a probability that the beam failure recovery response is monitored and then reducing time delay of beam failure recovery.

In addition, transmission of the beam failure recovery response for the first serving cell on all serving cells associated with the first serving cell, can also increase the probability that the beam failure recovery response is monitored, thereby reducing time delay of beam failure recovery.

Optionally, the base station determines whether a serving cell is in the beam failure recovery process in the following manners.

Manner 1: when the base station receives a beam failure event reported by the terminal, the base station determines that a serving cell indicated by the beam failure event is in the beam failure recovery process.

Manner 2: when the base station receives a beam failure event reported by the terminal and a new candidate beam reported by the terminal, the base station determines that a serving cell indicated by the beam failure event is in the beam failure recovery process.

Manner 3: after the base station transmits a beam failure recovery response to the terminal, the base station determines that a serving cell targeted by the beam failure recovery response is in the beam failure recovery process.

Manner 4: the base station receives a beam failure event related to a reference signal reported by the terminal, which reaches a condition for determining a beam failure in a serving cell. For example, the condition is that the terminal reports that all reference signals used for beam failure monitoring in one serving cell have beam failure.

In addition, the terminal may report failure beams to the base station in an explicit mode or an implicit mode. Specifically, for example, the terminal may indicate which beam fails through an ID of a reference signal; or if the terminal reports which serving cells have beam failure events to the base station, then it means that all beams that the terminal is monitoring for monitoring beam failure events have beam failure; or if the terminal reports a new candidate beam to the base station, it means that all beams that the terminal is monitoring for monitoring beam failure events have beam failure.

Optionally, selecting the first-type serving cell and/or the second-type serving cell, from the serving cells that have an association relationship with the first serving cell, as the second serving cell, includes:

sequentially traversing the serving cells that have an association relationship with the first serving cell; if the number of found first-type serving cells and/or second-type serving cells reaches a first preset number, then determining the first preset number of the first-type serving cells and/or second-type serving cells as the second serving cells; where the first preset number is greater than or equal to 1.

That is, the first-type serving cell, or the second-type serving cell, or the first-type serving cell and the second-type serving cell, may be found, in a sequential traversal manner, from the serving cells that have an association relationship with the first serving cell.

Specifically, an example is given below.

if there are L response cells that have an association relationship with the first serving cell (also referred to as a source cell), when selecting one cell (which may be referred to as a target response cell) from the L response cells to transmit a beam failure recovery response for the source cell, the following process may be used:

if a first response cell is not in the beam failure recovery process, the base station transmits the beam failure recovery response on the first response cell; if the first response cell is undergoing beam failure recovery and a second response cell is not in the beam failure recovery process, the base station transmits the beam failure recovery response on the second response cell; and so on, until the base station finds a target response cell;

or, if a first response cell is not in the beam failure recovery process or the first response cell is undergoing beam failure recovery but a new candidate beam reported by the terminal about the source cell is not in failure beams of the first response cell, the base station transmits the beam failure recovery response on the first response cell; otherwise, if a second response cell is not in the beam failure recovery process or the second response cell is undergoing beam failure recovery but a new candidate beam reported by the terminal about the source cell is not in failure beams of the second response cell, the base station transmits the beam failure recovery response on the second response cell; and so on, until the base station finds a target response cell.

Further, the sequentially traversing the serving cells that have an association relationship with the first serving cell, includes: according to priority orders of the serving cells that have an association relationship with the first serving cell, which are pre-defined or indicated by the base station, sequentially traversing the serving cells that have an association relationship with the first serving cell.

That is, when using the foregoing method to select one of the L response cells of the source cell to transmit the beam failure recovery response for the source cell, selection may be performed according to the priority orders of the L response cells, which are pre-defined or indicated by the base station.

Optionally, selecting the first-type serving cell from the serving cells that have an association relationship with the first serving cell, as the second serving cell, includes:

selecting serving cells belonging to the first-type serving cell from the serving cells that have an association relationship with the first serving cell;

selecting a second preset number of serving cells from the serving cells belonging to the first-type serving cell as the second serving cell; where the second preset number is greater than or equal to 1.

That is, the serving cells belonging to the first-type serving cell are first selected from the serving cells that have an association relationship with the first serving cell, and then at least one serving cell is selected from the serving cells belonging to the first-type serving cell as the second serving cell.

Further, the selecting the second preset number of serving cells from the serving cells belonging to the first-type serving cell as the second serving cell, includes:

according to priority orders of the serving cells that have an association relationship with the first serving cell, which are pre-defined or indicated by the base station, sorting the serving cells belonging to the first-type serving cell;

determining the second preset number of serving cells ranked first as the second serving cells.

Optionally, selecting the second-type serving cell from the serving cells that have an association relationship with the first serving cell, as the second serving cell, includes:

selecting serving cells belonging to the second-type serving cell from the serving cells that have an association relationship with the first serving cell;

selecting a third preset number of serving cells from the serving cells belonging to the second-type serving cell as the second serving cell; where the third preset number is greater than or equal to 1.

That is, the serving cells belonging to the second-type serving cell are first selected from the serving cells that have an association relationship with the first serving cell, and then at least one serving cell is selected from the serving cells belonging to the second-type serving cell as the second serving cell.

Further, the selecting the third preset number of serving cells from the serving cells belonging to the second-type serving cell as the second serving cell, includes:

according to priority orders of the serving cells that have an association relationship with the first serving cell, which are pre-defined or indicated by the base station, sorting the serving cells belonging to the second-type serving cell;

determining the third preset number of serving cells ranked first as the second serving cells.

Optionally, selecting the first-type serving cell and/or second-type serving cell from the serving cells that have an association relationship with the first serving cell, as the second serving cell, includes:

selecting serving cells belonging to the first-type serving cell and serving cells belonging to the second-type serving cell, from the serving cells that have an association relationship with the first serving cell;

selecting a fourth preset number of serving cells, from the serving cells belonging to the first-type serving cell and the serving cells belonging to the second-type serving cell, as the second serving cell; where the fourth preset number is greater than or equal to 1.

The fourth preset number of serving cells, selected from the serving cells belonging to the first-type serving cell and the serving cells belonging to the second-type serving cell, may include only the first-type serving cell, or only the second-type serving cell, or may include the first-type serving cell and the second-type serving cell.

Further, the selecting the fourth preset number of serving cells, from the serving cells belonging to the first-type serving cell and the serving cells belonging to the second-type serving cell, as the second serving cell, includes:

according to priority orders of the serving cells that have an association relationship with the first serving cell, which are pre-defined or indicated by the base station, sorting the serving cells belonging to the first-type serving cell and the serving cells belonging to the second-type serving cell;

determining the fourth preset number of serving cells ranked first as the second serving cells.

In addition, when selecting the second serving cells from the serving cells belonging to the first-type serving cell and the serving cells belonging to the second-type serving cell, first, a fifth preset number of serving cells may be selected from the serving cells belonging to the first-type serving cell, and a sixth preset number of serving cells may be selected from the serving cells belonging to the second-type serving cell; then, the selected fifth preset number of serving cells and sixth preset number of serving cells are together as the second serving cells. The fifth preset number and the sixth preset number are both greater than or equal to 1.

In addition, content and mode for the base station to transmit the beam failure recovery response, include but not limited to the following modes:

Mode 1: Physical Downlink Control Channel (PDCCH) transmitted on CORESET-BFR (which is CORESET used to transmit a beam failure recovery response, and which may be a specially configured CORESET or CORESET associated with a search space used for beam failure recovery).

Mode 2: transmitting transmission beam reconfiguration effective or activation information about PDCCH (or CORESET, or search space) of the source cell. Specifically, a Transmission Configuration Indicator (TCI) may be used to indicate state reconfiguration effective or activation information. For example, it may be activation information of TCI state of PDCCH of the source cell transmitted by Radio Resource Control (RRC) signaling, addition and/or deletion information of TCI state of PDCCH of the source cell transmitted by RRC signaling, or an activation command of TCI state of PDCCH of the source cell in Media Access Control control element (MAC-CE) signaling, or addition and/or deletion command of TCI state of PDCCH of the source cell in the MAC-CE signaling, or, an activation command of TCI state of PDCCH of the source cell in downlink control information (DCI), or, addition and/or deletion command of TCI state of PDCCH of the source cell in the DCI.

Mode 3: transmitting a reconfiguration message about PDCCH (or CORESET, or search space) of the source cell.

The reconfiguration message may be carried by RRC signaling, MAC-CE signaling, or DCI signaling.

Mode 4: transmitting transmission beam reconfiguration effective or activation information about PDCCH (or CORESET, or search space) of the source cell or a reconfiguration message about PDCCH (or CORESET, or search space) of the source cell.

Mode 5: transmitting PDCCH that schedules PUSCH for transmitting new data, where the PUSCH has the same HARQ process index as PUSCH carrying a new candidate beam.

Optionally, the base station uses a new candidate beam of the first serving cell reported by the terminal to the base station, to transmit the beam failure recovery response on the second serving cell.

Optionally, the terminal reports multiple new candidate beams, and each candidate beam has a corresponding serving cell for transmitting a beam failure recovery response. Then, the base station uses the new candidate beam corresponding to the second serving cell to transmit the beam failure recovery response on the second serving cell.

In summary, in the embodiments of the present disclosure, the beam failure recovery response for the first serving cell is transmitted on the serving cell that has an association relationship with the first serving cell; that is, the beam failure recovery response of the first serving cell is not only transmitted on the first serving cell and but also transmitted on other serving cell that has an association relationship with the first serving cell, thereby increasing the probability that the beam failure recovery response is successfully transmitted to the terminal, and then reducing the time delay of the beam failure recovery process.

In addition, optionally, since the base station may transmit PDCCH through multiple downlink control channel beams, downlink beam failure is defined as: a quality of each downlink control channel beam received by the terminal is lower than a specified threshold, resulting in that the terminal is unable to effectively receive control information transmitted by PDCCH channel.

Without loss of generality, it is assumed that the base station has M beams for transmission of downlink control channels, and a dedicated reference signal is configured for each beam. The terminal determines whether a downlink control channel meets a reception quality requirement by measuring the reference signals of the M beams. If channel qualities of all M beams are lower than a preset threshold, the terminal considers that a beam failure event has occurred.

A monitoring index parameter of beam failure in the NR system is a block error rate (BLER). A specific process is as follows: the terminal measures performance of a reference signal used for beam failure monitoring of the same beam as the downlink control channel; based on a measured quality (such as signal-to-interference and noise ratio, RSRP, RSRQ) of reference signal, estimating a block error rate (BLER) of the PDCCH channel; if a BLER value is greater than the preset threshold (for example, BLER=10%), determining that the beam has failed; when BLER values of all M beams measured by the terminal are greater than the threshold, determining that a beam failure event occurs. In the process of measuring the BLER, there is no need to demodulate and decode the PDCCH channel, it just measures the performance of the corresponding reference signal and estimates the BLER of the PDCCH channel based on a result of the reference signal. Since the purpose of beam failure measurement is to know whether the downlink control channel can be correctly received by the terminal, the BLER value can achieve this purpose well.

In addition, when the terminal measures a beam failure event and reports the event to the base station, the terminal may further report new candidate beam information. After receiving the reported information, the base station recovers from the beam failure as soon as possible through the beam recovery process, and reselects a new beam for transmission to replace the original beam. The new beam will be used for transmission of the base station's response information (which may include part or all of beam failure recovery responses) to the reported failure event, and for subsequent transmission of data and control information between the base station and the terminal.

In order to enable the terminal to report a new candidate beam, the network may configure the terminal with corresponding a reference signal resource set, and these reference signals are corresponding to candidate beam sets. The terminal determines a pair of transceiver beams used for transmission link by measuring the reference signal set. After the terminal completes the measurement, the terminal reports a new candidate beam to the network. The selected new candidate beam needs to meet a performance threshold requirement that a reference signal receiving power (RSRP) exceeds a threshold. In the standard, the terminal only reports a new candidate beam to the base station. If it is found in the measurement process that the quality of multiple beams meets the threshold requirement, the terminal may select, according to its own judgment, one of the multiple beams to report to the base station, for example, reporting the strongest beam.

In beam failure measurement and recovery process, in order not to affect conventional random access process, a physical random access channel (PRACH) may be used to report a beam failure recovery event. The PRACH is an uplink synchronization and information exchange channel used by the terminal to initially access the network. By transmitting an uplink preamble sequence through the PRACH, the network may realize functions such as terminal confirmation, uplink synchronization measurement, and contention resolution. In the 5G NR, the system supports multiple PRACHs, and each PRACH may be corresponding to one SSB (different SSBs use beams of different transmission directions to transmit broadcast information), and the PRACH selected by the terminal is corresponding to a most suitable SSB beam transmission direction for downlink. Therefore, if the reference signal corresponding to the candidate downlink beam establishes a one-to-one correspondence with uplink PRACH, it means that the base station can obtain the candidate beam information reported by the terminal through the detected PRACH. The PRACH may use a competitive PHY layer channel or non-competitive dedicated PHY layer channel. If the PRACH is a non-competitive PRACH, the terminal will be allocated dedicated random access channel resources and random access preamble sequences. Each random access channel and each preamble sequence are corresponding to a beam direction of an SSB transmission block. Once a downlink beam failure event occurs and a new candidate beam is selected, it will be transmitted through the random access channel and preamble sequence corresponding to the new candidate beam.

Another mechanism that can be used for beam failure recovery is to use PUCCH to report a candidate beam. It can be understood that other modes for reporting candidate beams are not excluded, for example, reporting a candidate beam through physical uplink shared channel (PUSCH). In the 5G NR standard, the PUCCH is used for transmission of uplink control signaling. The PUCCH reports various types of uplink control signaling to the network, including acknowledgement/negative acknowledgement (ACK/NACK) information, scheduling request, channel state information (CSI) and beam measurement results, etc. One terminal may be configured with multiple PUCCH resources, and each PUCCH resource is corresponding to different physical resources, transmission powers, load capacities and load types. The PUCCH is configured by the network for transmission beam. Compared with the PRACH, the PUCCH exhibits better reporting capabilities and flexibility, and more information such as multiple candidate beams and beam quality can be reported to the network through the PUCCH.

In addition, each terminal may be allocated with multiple CORESETs for PDCCH transmission, and each CORESET is configured with a beam transmission direction. Beams corresponding to these original CORESETs will not change in the beam recovery process. The network configures a dedicated CORESET for the terminal, called CORESET_BFR, which is used for control signaling transmission of beam failure recovery. After the terminal measures and reports a beam failure message, the terminal may start to monitor PDCCH of CORESET_BFR and it is assumed that the beam used is the reported new candidate beam. Corresponding to reporting process of the terminal, the base station may use the new beam to transmit the PDCCH in the CORESET_BFR. When the terminal detects the PDCCH, the terminal considers that the reported beam failure event and the new candidate beam are correctly received by the base station.

After the base station receives the beam failure event report and transmits a response message in CORESET_BFR, if the terminal does not receive an RRC reconfiguration message (which is used for beam configuration of the original CORESET set), CORESET_BFR may be used as another CORESET for scheduling for normal communication; if the terminal receives an RRC reconfiguration message, the terminal obtains new beam configuration of the CORESET set according to the RRC reconfiguration message and stops monitoring CORESET_BFR.

In the beam recovery process, the original CORESET may still use originally configured beams, and the terminal also monitors PDCCH in original beam directions. Although the terminal has reported to the base station that all control channels are in a beam failure state, such judgment is obtained based on 10% of BLER measurement results, and the terminal may still receive control signaling messages on the original PDCCH channel. Therefore, when the base station receives the beam failure report and transmits a response message in CORESET_BFR, the base station and the terminal may continue to communicate with the originally configured CORESET set and beam parameters, and may reconfigure beams of downlink control channels.

Second Embodiment

Figure 2:
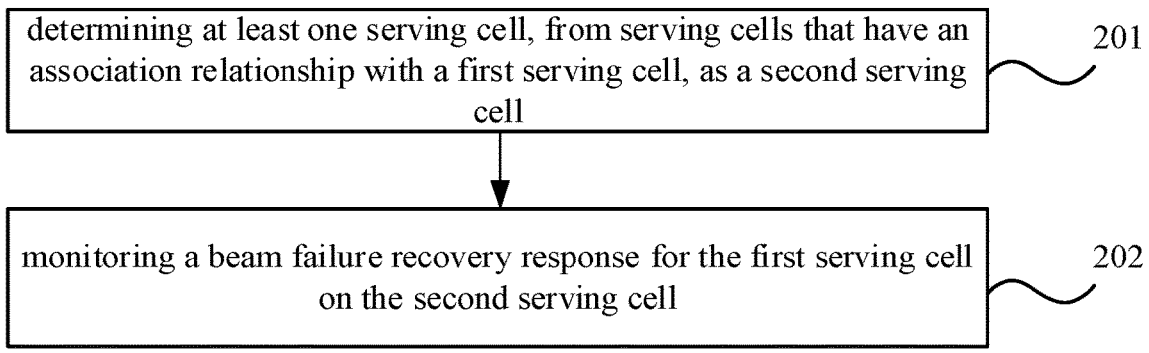
FIG. 2 is a flowchart of a beam failure recovery response monitoring method according to a second embodiment of the present disclosure.

As shown in FIG. 2, one embodiment of the present disclosure provides a beam failure recovery response monitoring method, which specifically includes the following steps.

Step 201: determining at least one serving cell, from serving cells that have an association relationship with a first serving cell, as a second serving cell.

One serving cell having an association relationship with the first serving cell, indicates that the one serving cell can be used to transmit a beam failure recovery response of the first serving cell, that is, the one serving cell is one of candidate serving cells used to transmit the beam failure recovery response of the first serving cell. In other words, the one serving cell can be used to transmit the beam failure recovery response of the first serving cell, but the one serving cell is not necessarily used to transmit the beam failure recovery response of the first serving cell.

Specifically, the association relationship may be an association relationship directly associated with the first serving cell, or may be a relationship indirectly associated with the first serving cell.

Optionally, the association relationship includes a first association relationship directly associated with the first serving cell and/or a second association relationship associated with a new candidate beam of the first serving cell reported by the terminal to the base station. That is, one serving cell may be directly associated with the first serving cell, or one serving cell may be associated with a new candidate beam of the first serving cell, thereby achieving an indirect association with the first serving cell.

One serving cell directly having a first association relationship with the first serving cell, indicates that the one serving cell can be used to transmit a beam failure recovery response of the first serving cell, that is, the one serving cell is one of candidate serving cells used to transmit the beam failure recovery response of the first serving cell. In other words, the one serving cell can be used to transmit the beam failure recovery response of the first serving cell, but the one serving cell is not necessarily used to transmit the beam failure recovery response of the first serving cell.

In addition, one serving cell having a second association relationship with the new candidate beam of the first serving cell, indicates that the one serving cell is a cell that is corresponding to the new candidate beam and can be used to transmit the beam failure recovery response of the first serving cell. The one serving cell is one of candidate serving cells used to transmit the beam failure recovery response of the first serving cell. The one serving cell can be used to transmit the beam failure recovery response of the first serving cell, but the one serving cell is not necessarily used to transmit the beam failure recovery response of the first serving cell.

Optionally, one serving cell that has an association relationship with the first serving cell is configured by the base station or predefined.

Specifically, the base station may configure a cell for the terminal to receive a beam failure recovery response of a cell (i.e., serving cell, or carrier) through signaling. For the convenience of description, one cell used for receiving the beam failure recovery response of a cell is referred as a response cell. Specific configuration modes of the response cell are as follows.

Mode 1: the base station configures a response cell for each cell. For example, the base station configures an identifier of a response cell for a beam failure recovery of each cell.

Mode 2: the base station configures response cells used to receive beam failure recovery responses of cells, and these response cells are applicable to all cells.

Mode 3: the base station indicates a response cell corresponding to each cell to the terminal through indication signaling. The terminal determines a response cell corresponding to a cell based on the indication signaling.

Optionally, an association of one serving cell with a new candidate beam of the first serving cell reported by the terminal to the base station, may be implemented in the following manner.

When configuring a candidate beam for beam failure recovery for the terminal, the base station may configure an associated serving cell for the candidate beam. Then, when the terminal reports a new candidate beam to the base station, one serving cell associated with the new candidate beam is a serving cell that has an association relationship with the first serving cell. Optionally, the base station may configure the terminal with a candidate beam for beam failure recovery of the first serving cell by configuring, for the terminal, a search space for beam failure recovery of the first serving cell, where the search space is associated with one or more CORESETs. Each CORESET is implemented as being associated with a reference signal used to represent its transmission beam. At this point, a serving cell where the CORESET is located, can be regarded as being associated with the first serving cell.

Optionally, a pre-defined serving cell that has an association relationship with the first serving cell, is a serving cell currently in an active state.

Optionally, a pre-defined serving cell that has an association relationship with the first serving cell, is a serving cell where the terminal reports a beam failure event of the first serving cell to the base station.

Optionally, a pre-defined serving cell that has an association relationship with the first serving cell, is a serving cell where the terminal reports a new candidate beam of the first serving cell to the base station.

Optionally, a pre-defined serving cell that has an association relationship with the first serving cell, is a serving cell that has a downlink in a frequency band where the first serving cell is located.

Optionally, a pre-defined serving cell that has an association relationship with the first serving cell, is a serving cell corresponding to a new candidate beam of the first serving cell reported by the terminal to the base station. For example, the base station configures, for candidate beams used for beam failure recovery of the first serving cell, serving cells for transmitting beam failure recovery responses; and these serving cells may be considered as serving cells corresponding to the candidate beams. Then, one serving cell corresponding to the new candidate beam of the first serving cell reported by the terminal to the base station, is a serving cell, which is corresponding to the new candidate beam of the first serving cell reported by the terminal to the base station and is used for transmitting a beam failure recovery response.

Optionally, a pre-defined serving cell that has an association relationship with the first serving cell, includes the first serving cell.

Optionally, a pre-defined serving cell that has an association relationship with the first serving cell includes one or more of a serving cell currently in an active state, a serving cell where the terminal reports a beam failure event of the first serving cell to the base station, a serving cell where the terminal reports a new candidate beam of the first serving cell to the base station, a serving cell corresponding to a new candidate beam of the first serving cell reported by the terminal to the base station, and a serving cell that has a downlink in a frequency band where the first serving cell is located.

When the first serving cell is a secondary serving cell, a pre-defined serving cell that has an association relationship with the first serving cell may also include a primary serving cell.

Optionally, the determining at least one serving cell, from serving cells that have an association relationship with a first serving cell, as a second serving cell, includes:

selecting a first-type serving cell and/or a third-type serving cell, from the serving cells that have the association relationship with the first serving cell, as the second serving cell;

or, taking each serving cell that has an association relationship with the first serving cell as the second serving cell;

where the first-type serving cell is not in a beam failure recovery process; the third-type serving cell is in a beam failure recovery process, and the new candidate beam of the first serving cell reported by the terminal to the base station is not in failure beams of the third-type serving cell reported by the terminal to the base station and/or the terminal does not detect that the new candidate beam of the first serving cell reported by the terminal to the base station has a beam failure in the third-type serving cell.

Optionally, the terminal may monitor multiple transmission beams of a serving cell (for example, by monitoring signal qualities of reference signals corresponding to the transmission beams), but the terminal may only report a part of failure beams. For example, in addition to monitoring beams used for beam failure monitoring, the terminal further monitors candidate beams for beam failure recovery; but only when all beams used for beam failure monitoring fail and the terminal detects at least one candidate beam with good enough quality, the terminal reports a beam failure event and the candidate beam with good enough quality. When the base station receives information reported by the terminal, the base station knows that all beams used for beam failure monitoring have failed and the candidate beam with good enough quality reported by the terminal has not failed, but the base station does not know whether other beams have failed. In fact, the terminal may also detect that some candidate beams have failed, but the terminal does not report it.

For example, if beams corresponding to a serving cell includes five beams A, B, C, D, and E, the terminal detects that the beams A, B, and C have beam failures, and reports beam failures of the beams A and B to the base station. If a new candidate beam of the first serving cell reported by the terminal, is the beam D, since the beam D is not "in the failure beams of the serving cell reported by the terminal to the base station", the serving cell is a third-type serving cell. However, if the terminal detects that the beams A, B, and C have beam failures, and reports beam failures of the beams A and B to the base station. Then, if a new candidate beam of the first serving cell reported by the terminal, is the beam B, since the beam B is "in the failure beams of the serving cell reported by the terminal to the base station", the serving cell is not a third-type serving cell.

In addition, if beams corresponding to a serving cell includes five beams A, B, C, D, and E, the terminal detects that the beams A, B, and C have beam failures. If a new candidate beam of the first serving cell reported by the terminal, is the beam D, since the beam D is not "in the failure beams of the serving cell reported by the terminal to the base station", the serving cell is a third-type serving cell. However, if the terminal detects that the beams A, B, and C have beam failures, and a new candidate beam of the first serving cell reported by the terminal, is the beam B, since the beam B is "in the failure beams of the serving cell reported by the terminal to the base station", the serving cell is not a third-type serving cell.

That is, at least one first-type serving cell may be selected as the second serving cell from the serving cells associated with the first serving cell, or, at least one third-type serving cell may be selected as the second serving cell from the serving cells associated with the first serving cell, at least one first-type serving cell and at least one third-type serving cell may be selected as the second serving cells from the serving cells associated with the first serving cell, or, all serving cells associated with the first serving cell are used as the second serving cells.

Since the first-type serving cell is not in a beam failure recovery process, monitoring the beam failure recovery response for the first serving cell on the first-type serving cell can increase a probability that the beam failure recovery response is monitored, thereby reducing time delay of beam failure recovery.

Although the third-type serving cell is in a beam failure recovery process, and the new candidate beam of the first serving cell reported by the terminal to the base station is not in failure beams of the third-type serving cell reported by the terminal to the base station, thus, monitoring the beam failure recovery response for the first serving cell on the third-type serving cell enables the beam failure recovery response to be transmitted on beams without failure, thereby increasing a probability that the beam failure recovery response is monitored and then reducing time delay of beam failure recovery.

In addition, monitoring the beam failure recovery response for the first serving cell on all serving cells associated with the first serving cell, can also increase the probability that the beam failure recovery response is monitored, thereby reducing time delay of beam failure recovery.

Optionally, the terminal determines whether a serving cell is in the beam failure recovery process in the following manners.

Manner 1: after the terminal reports a beam failure event to a base station, the terminal determines that a serving cell indicated by the beam failure event is in the beam failure recovery process.

Manner 2: after the terminal reports a beam failure event and a new candidate beam to a base station, the terminal determines that a serving cell indicated by the beam failure event is in the beam failure recovery process.

Manner 3: after the terminal receives a beam failure recovery response transmitted by the base station, the terminal determines that a serving cell targeted by the beam failure recovery response is in the beam failure recovery process.

Manner 4: when the terminal detects a beam failure in a serving cell, the terminal determines that the serving cell is in the beam failure recovery process.

In addition, the terminal may report failure beams to the base station in an explicit mode or an implicit mode. Specifically, for example, the terminal may indicate which beam fails through an ID of a reference signal; or if the terminal reports which serving cells have beam failure events to the base station, then it means that all beams that the terminal is monitoring for monitoring beam failure events have beam failure; or if the terminal reports a new candidate beam to the base station, it means that all beams that the terminal is monitoring for monitoring beam failure events have beam failure.

Optionally, selecting the first-type serving cell and/or the third-type serving cell, from the serving cells that have an association relationship with the first serving cell, as the second serving cell, includes:

sequentially traversing the serving cells that have an association relationship with the first serving cell; if the number of found first-type serving cells and/or third-type serving cells reaches a first preset number, then determining the first preset number of the first-type serving cells and/or third-type serving cells as the second serving cells; where the first preset number is greater than or equal to 1.

That is, the first-type serving cell, or the third-type serving cell, or the first-type serving cell and the third-type serving cell, may be found, in a sequential traversal manner, from the serving cells that have an association relationship with the first serving cell.

Specifically, an example is given below.

if there are L response cells that have an association relationship with the first serving cell (also referred to as a source cell), when selecting one cell (which may be referred to as a target response cell) from the L response cells to monitor a beam failure recovery response for the source cell, the following process may be used:

if a first response cell is not in the beam failure recovery process, the terminal monitors the beam failure recovery response on the first response cell; if the first response cell is undergoing beam failure recovery and a second response cell is not in the beam failure recovery process, the terminal monitors the beam failure recovery response on the second response cell; and so on, until the terminal finds a target response cell;

or, if a first response cell is not in the beam failure recovery process or the first response cell is undergoing beam failure recovery but a new candidate beam reported by the terminal about the source cell is not in failure beams of the first response cell, the terminal monitors the beam failure recovery response on the first response cell; otherwise, if a second response cell is not in the beam failure recovery process or the second response cell is undergoing beam failure recovery but a new candidate beam reported by the terminal about the source cell is not in failure beams of the second response cell, the terminal monitors the beam failure recovery response on the second response cell; and so on, until the terminal finds a target response cell.

Further, the sequentially traversing the serving cells that have an association relationship with the first serving cell, includes: according to priority orders of the serving cells that have an association relationship with the first serving cell, which are pre-defined or indicated by the base station, sequentially traversing the serving cells that have an association relationship with the first serving cell.

That is, when using the foregoing method to select one of the L response cells of the source cell to monitor the beam failure recovery response for the source cell, selection may be performed according to the priority orders of the L response cells, which are pre-defined or indicated by the base station.

Optionally, selecting the first-type serving cell from the serving cells that have an association relationship with the first serving cell, as the second serving cell, includes:

selecting serving cells belonging to the first-type serving cell from the serving cells that have an association relationship with the first serving cell;

selecting a second preset number of serving cells from the serving cells belonging to the first-type serving cell as the second serving cell; where the second preset number is greater than or equal to 1.

That is, the serving cells belonging to the first-type serving cell are first selected from the serving cells that have an association relationship with the first serving cell, and then at least one serving cell is selected from the serving cells belonging to the first-type serving cell as the second serving cell.

Further, the selecting the second preset number of serving cells from the serving cells belonging to the first-type serving cell as the second serving cell, includes:

according to priority orders of the serving cells that have an association relationship with the first serving cell, which are pre-defined or indicated by the base station, sorting the serving cells belonging to the first-type serving cell;

determining the second preset number of serving cells ranked first as the second serving cells.

Optionally, selecting the third-type serving cell from the serving cells that have an association relationship with the first serving cell, as the second serving cell, includes:

selecting serving cells belonging to the third-type serving cell from the serving cells that have an association relationship with the first serving cell;

selecting a third preset number of serving cells from the serving cells belonging to the third-type serving cell as the second serving cell; where the third preset number is greater than or equal to 1.

That is, the serving cells belonging to the third-type serving cell are first selected from the serving cells that have an association relationship with the first serving cell, and then at least one serving cell is selected from the serving cells belonging to the third-type serving cell as the second serving cell.

Further, the selecting the third preset number of serving cells from the serving cells belonging to the third-type serving cell as the second serving cell, includes:

according to priority orders of the serving cells that have an association relationship with the first serving cell, which are pre-defined or indicated by the base station, sorting the serving cells belonging to the third-type serving cell;

determining the third preset number of serving cells ranked first as the second serving cells.

Optionally, selecting the first-type serving cell and/or third-type serving cell from the serving cells that have an association relationship with the first serving cell, as the second serving cell, includes:

selecting serving cells belonging to the first-type serving cell and serving cells belonging to the third-type serving cell, from the serving cells that have an association relationship with the first serving cell;

selecting a fourth preset number of serving cells, from the serving cells belonging to the first-type serving cell and the serving cells belonging to the third-type serving cell, as the second serving cell; where the fourth preset number is greater than or equal to 1.

The fourth preset number of serving cells, selected from the serving cells belonging to the first-type serving cell and the serving cells belonging to the third-type serving cell, may include only the first-type serving cell, or only the third-type serving cell, or may include the first-type serving cell and the third-type serving cell.

Further, the selecting the fourth preset number of serving cells, from the serving cells belonging to the first-type serving cell and the serving cells belonging to the fourth-type serving cell, as the second serving cell, includes:

according to priority orders of the serving cells that have an association relationship with the first serving cell, which are pre-defined or indicated by the base station, sorting the serving cells belonging to the first-type serving cell and the serving cells belonging to the third-type serving cell;

determining the fourth preset number of serving cells ranked first as the second serving cells.

In addition, when selecting the second serving cells from the serving cells belonging to the first-type serving cell and the serving cells belonging to the third-type serving cell, first, a fifth preset number of serving cells may be selected from the serving cells belonging to the first-type serving cell, and a sixth preset number of serving cells may be selected from the serving cells belonging to the third-type serving cell; then, the selected fifth preset number of serving cells and sixth preset number of serving cells are together as the second serving cells. The fifth preset number and the sixth preset number are both greater than or equal to 1.

Step 202: monitoring a beam failure recovery response for the first serving cell on the second serving cell.

Optionally, the monitoring the beam failure recovery response for the first serving cell on the second serving cell, includes:

periodically monitoring the beam failure recovery response for the first serving cell on the second serving cell; or, according to a first preset period, determining at least one serving cell, from the serving cells that have an association relationship with the first serving cell, as the second serving cell;

according to a second preset period, monitoring the beam failure recovery response for the first serving cell on the last determined second serving cell.

The foregoing first preset period and the second preset period may be the same or different. If the first preset period is the same as the second preset period, the second serving cell is re-determined in each period. If the first preset period is different from the second preset period, when a period for monitoring the beam failure recovery response (i.e., the second preset period) arrives, the beam failure recovery response is monitored on the last determined second serving cell.

In addition, optionally, the process of determining at least one serving cell from the serving cells that have an association relationship with the first serving cell, as the second serving cell, may also be aperiodic, but dynamic. That is, the terminal dynamically determines, according to a preset rule, at least one serving cell from the serving cells that have an association relationship with the first serving cell, as the second serving cell, and then monitors the beam failure recovery response for the first serving cell on the newly determined second serving cell.

That is, the terminal may monitor a beam failure recovery response on a fixed second serving cell for one first serving cell in one beam failure recovery process. The terminal may also monitor a beam failure recovery response on different second serving cells in different beam failure recovery response monitoring periods in a beam failure recovery process. For example, in a first period, the terminal monitors a beam failure recovery response of a cell on a first responding cell; but in a second period, the first response cell starts a beam failure recovery process, then the terminal may monitor a beam failure recovery response of the cell on a second response cell.

Optionally, the terminal periodically monitors the beam failure recovery response according to a period corresponding to a search space used for beam failure detection.

Optionally, the terminal may always monitor the beam failure recovery response transmitted by the base station until a certain termination condition is met. For example, after the terminal starts a beam failure recovery process, the terminal has been monitoring PDCCH on CORESET-BFR (which is CORESET associated with a search space for beam failure recovery). Assuming that the terminal considers that PDCCH detected on the CORESET-BFR is corresponding to receiving the beam failure recovery response transmitted by the base station, then, the terminal stops continuing to monitor the beam failure recovery response until the terminal receives reconfiguration or activation information of TCI state of PDCCH (or CORESET) of the source cell.

Optionally, the terminal monitors the beam failure recovery response for the first serving cell on the second serving cell by using a reception beam corresponding to the new candidate beam for beam failure recovery of the first serving cell reported by the terminal.

In summary, in the embodiments of the present disclosure, the beam failure recovery response for the first serving cell is monitored on the serving cell that has an association relationship with the first serving cell; that is, the beam failure recovery response for the first serving cell is not monitored only on the first serving cell, but also monitored on other serving cell that has an association relationship with the first serving cell, thereby increasing the probability that the beam failure recovery response is successfully transmitted to the terminal, and then reducing the time delay of the beam failure recovery process.

Third Embodiment

Figure 3:
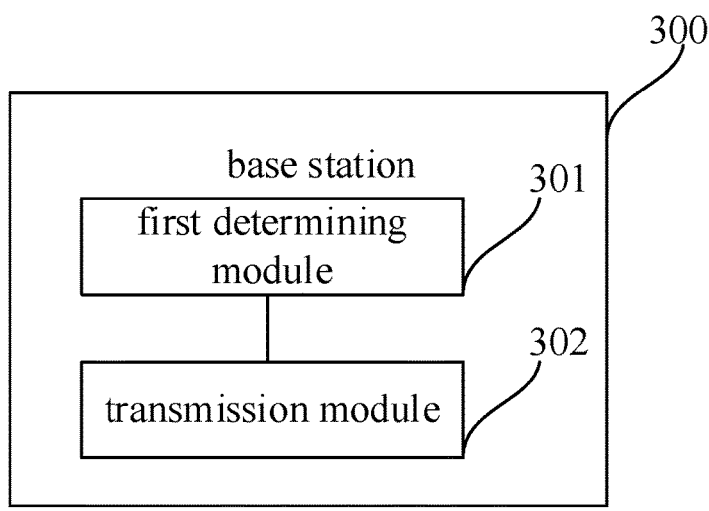
FIG. 3 is a schematic diagram showing modules of a base station according to a third embodiment of the present disclosure.

As shown in FIG. 3, one embodiment of the present disclosure provides a base station. The base station 300 includes:

a first determining module 301 configured to determine at least one serving cell, from serving cells that have an association relationship with a first serving cell, as a second serving cell;

a transmission module 302 configured to transmit a beam failure recovery response for the first serving cell on the second serving cell.

Optionally, the first determining module 301 includes:

a first determining unit configured to select a first-type serving cell and/or a second-type serving cell, from the serving cells that have the association relationship with the first serving cell, as the second serving cell;

or a second determining unit configured to take each serving cell that has an association relationship with the first serving cell as the second serving cell;

where the first-type serving cell is not in a beam failure recovery process; the second-type serving cell is in a beam failure recovery process, and a new candidate beam of the first serving cell reported by the terminal to the base station is not in failure beams of the second-type serving cell reported by the terminal to the base station.

Optionally, the association relationship includes a first association relationship directly associated with the first serving cell and/or a second association relationship associated with a new candidate beam of the first serving cell reported by the terminal to the base station.

Optionally, the first determining unit includes:

a first determining subunit configured to sequentially traverse the serving cells that have an association relationship with the first serving cell; if the number of found first-type serving cells and/or second-type serving cells reaches a first preset number, then determine the first preset number of the first-type serving cells and/or second-type serving cells as the second serving cells; where the first preset number is greater than or equal to 1.

Optionally, when sequentially traversing the serving cells that have an association relationship with the first serving cell, the first determining subunit is specifically configured to, according to priority orders of the serving cells that have an association relationship with the first serving cell, which are pre-defined or indicated by the base station, sequentially traverse the serving cells that have an association relationship with the first serving cell.

Optionally, the first determining unit includes:

a first selection subunit configured to select serving cells belonging to the first-type serving cell from the serving cells that have an association relationship with the first serving cell;

a second selection subunit configured to select a second preset number of serving cells from the serving cells belonging to the first-type serving cell as the second serving cell; where the second preset number is greater than or equal to 1.

Optionally, the second selection subunit is specifically configured to, according to priority orders of the serving cells that have an association relationship with the first serving cell, which are pre-defined or indicated by the base station, sort the serving cells belonging to the first-type serving cell;

determine the second preset number of serving cells ranked first as the second serving cells.

Optionally, the first determining unit includes:

a third selection subunit configured to select serving cells belonging to the second-type serving cell from the serving cells that have an association relationship with the first serving cell;

a fourth selection subunit configured to select a third preset number of serving cells from the serving cells belonging to the second-type serving cell as the second serving cell; where the third preset number is greater than or equal to 1.

Optionally, the fourth selection subunit is specifically configured to, according to priority orders of the serving cells that have an association relationship with the first serving cell, which are pre-defined or indicated by the base station, sort the serving cells belonging to the second-type serving cell;

determine the third preset number of serving cells ranked first as the second serving cells.

Optionally, the first determining unit includes:

a fifth selection subunit configured to select serving cells belonging to the first-type serving cell and serving cells belonging to the second-type serving cell, from the serving cells that have an association relationship with the first serving cell;

a sixth selection subunit configured to select a fourth preset number of serving cells, from the serving cells belonging to the first-type serving cell and the serving cells belonging to the second-type serving cell, as the second serving cell; where the fourth preset number is greater than or equal to 1.

Optionally, the sixth selection subunit is specifically configured to, according to priority orders of the serving cells that have an association relationship with the first serving cell, which are pre-defined or indicated by the base station, sort the serving cells belonging to the first-type serving cell and the serving cells belonging to the second-type serving cell;

determine the fourth preset number of serving cells ranked first as the second serving cells.

Optionally, the serving cell that has an association relationship with the first serving cell is configured by the base station or predefined.

Optionally, a pre-defined serving cell that has an association relationship with the first serving cell includes one or more of a serving cell currently in an active state, a serving cell where the terminal reports a beam failure event of the first serving cell to the base station, a serving cell where the terminal reports a new candidate beam of the first serving cell to the base station, a serving cell corresponding to a new candidate beam of the first serving cell reported by the terminal to the base station, and a serving cell that has a downlink in a frequency band where the first serving cell is located.

Fourth Embodiment

Figure 4:
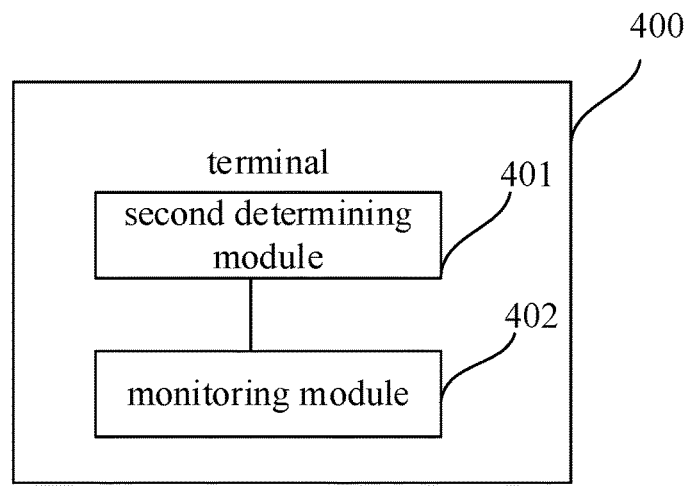
FIG. 4 is a schematic diagram showing modules of a terminal according to a fourth embodiment of the present disclosure.

As shown in FIG. 4, one embodiment of the present disclosure provides a terminal. The terminal 400 includes:

a second determining module 401 configured to determine at least one serving cell, from serving cells that have an association relationship with a first serving cell, as a second serving cell;

a monitoring module 402 configured to monitor a beam failure recovery response for the first serving cell on the second serving cell.

Optionally, the second determining module 401 includes:

a third determining unit configured to select a first-type serving cell and/or a third-type serving cell, from the serving cells that have the association relationship with the first serving cell, as the second serving cell;

or, a fourth determining unit configured to take each serving cell that has an association relationship with the first serving cell as the second serving cell;

where the first-type serving cell is not in a beam failure recovery process; the third-type serving cell is in a beam failure recovery process, and the new candidate beam of the first serving cell reported by the terminal to the base station is not in failure beams of the third-type serving cell reported by the terminal to the base station and/or the terminal does not detect that the new candidate beam of the first serving cell reported by the terminal to the base station has a beam failure in the third-type serving cell.

Optionally, the association relationship includes a first association relationship directly associated with the first serving cell and/or a second association relationship associated with a new candidate beam of the first serving cell reported by the terminal to the base station.

Optionally, the third determining unit includes:

a second determining subunit configured to sequentially traverse the serving cells that have an association relationship with the first serving cell; if the number of found first-type serving cells and/or third-type serving cells reaches a first preset number, then determine the first preset number of the first-type serving cells and/or third-type serving cells as the second serving cells; where the first preset number is greater than or equal to 1.

Optionally, when the second determining subunit sequentially traverses the serving cells that have an association relationship with the first serving cell, the second determining subunit is specifically configured to, according to priority orders of the serving cells that have an association relationship with the first serving cell, which are pre-defined or indicated by the base station, sequentially traverse the serving cells that have an association relationship with the first serving cell.

Optionally, the third determining unit includes:

a seventh selection subunit configured to select serving cells belonging to the first-type serving cell from the serving cells that have an association relationship with the first serving cell;

an eighth selection subunit configured to select a second preset number of serving cells from the serving cells belonging to the first-type serving cell as the second serving cell; where the second preset number is greater than or equal to 1.

Optionally, the eighth selection subunit is specifically configured to, according to priority orders of the serving cells that have an association relationship with the first serving cell, which are pre-defined or indicated by the base station, sort the serving cells belonging to the first-type serving cell;

determine the second preset number of serving cells ranked first as the second serving cells.

The third determining unit further includes:

a ninth selection subunit configured to select serving cells belonging to the third-type serving cell from the serving cells that have an association relationship with the first serving cell;

a tenth selection subunit configured to select a third preset number of serving cells from the serving cells belonging to the third-type serving cell as the second serving cell; where the third preset number is greater than or equal to 1.

Optionally, the tenth selection subunit is specifically configured to, according to priority orders of the serving cells that have an association relationship with the first serving cell, which are pre-defined or indicated by the base station, sort the serving cells belonging to the third-type serving cell;

determine the third preset number of serving cells ranked first as the second serving cells.

Optionally, the third determining unit includes:

an eleventh selection subunit configured to select serving cells belonging to the first-type serving cell and serving cells belonging to the third-type serving cell, from the serving cells that have an association relationship with the first serving cell;

a twelfth selection subunit configured to select a fourth preset number of serving cells, from the serving cells belonging to the first-type serving cell and the serving cells belonging to the third-type serving cell, as the second serving cell; where the fourth preset number is greater than or equal to 1.

Optionally, the twelfth selection subunit is specifically configured to, according to priority orders of the serving cells that have an association relationship with the first serving cell, which are pre-defined or indicated by the base station, sort the serving cells belonging to the first-type serving cell and the serving cells belonging to the third-type serving cell;

determine the fourth preset number of serving cells ranked first as the second serving cells.

Optionally, the serving cell that has an association relationship with the first serving cell is configured by the base station or predefined.

Optionally, a pre-defined serving cell that has an association relationship with the first serving cell includes one or more of a serving cell currently in an active state, a serving cell where the terminal reports a beam failure event of the first serving cell to the base station, a serving cell where the terminal reports a new candidate beam of the first serving cell to the base station, a serving cell corresponding to a new candidate beam of the first serving cell reported by the terminal to the base station, and a serving cell that has a downlink in a frequency band where the first serving cell is located.

Optionally, the monitoring module 402 includes:

a first monitoring unit configured to periodically monitor the beam failure recovery response for the first serving cell on the second serving cell;

or, the second determining module 401 includes:

a period selection unit configured to, according to a first preset period, determine at least one serving cell, from the serving cells that have an association relationship with the first serving cell, as the second serving cell;

the monitoring module 402 includes:

a second monitoring unit configured to, according to a second preset period, monitor the beam failure recovery response for the first serving cell on the last determined second serving cell.

Fifth Embodiment

Figure 5:
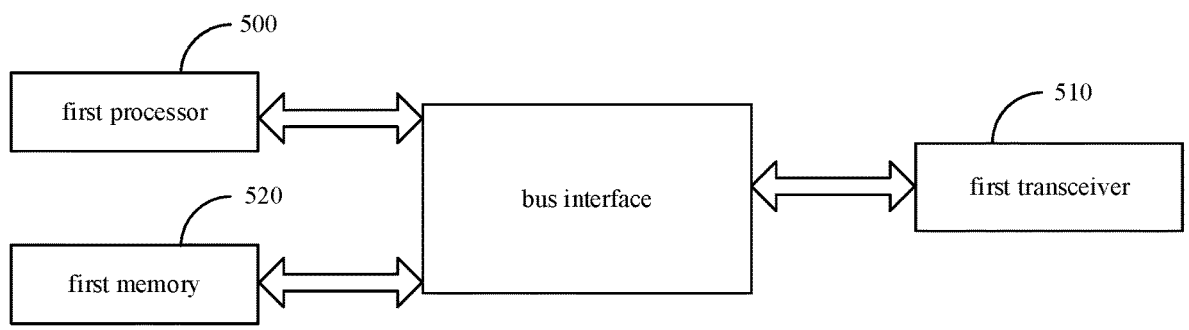
FIG. 5 is a schematic block diagram of a base station according to a fifth embodiment of the present disclosure.

In order to better achieve the foregoing purpose, as shown in FIG. 5, one embodiment provides a base station, including: a first processor 500, a first memory 520 connected to the first processor 500 through a bus interface, and a first transceiver 510 connected to the first processor 500 through the bus interface.

The first memory 520 is configured to store programs and data used by the first processor 500 when performing operations. Data information or pilots are transmitted through the first transceiver 510. An uplink control channel is also received through the first transceiver 510. When the first processor 500 calls and executes the programs and data stored in the first memory 520, the first processor 500 is configured to, determine at least one serving cell, from serving cells that have an association relationship with a first serving cell, as a second serving cell; and transmit a beam failure recovery response for the first serving cell on the second serving cell.

Optionally, when the first processor 500 determines at least one serving cell, from serving cells that have an association relationship with a first serving cell, as a second serving cell, the first processor 500 is specifically configured to, select a first-type serving cell and/or a second-type serving cell, from the serving cells that have the association relationship with the first serving cell, as the second serving cell;

or, take each serving cell that has an association relationship with the first serving cell as the second serving cell;

where the first-type serving cell is not in a beam failure recovery process; the second-type serving cell is in a beam failure recovery process, and a new candidate beam of the first serving cell reported by the terminal to the base station is not in failure beams of the second-type serving cell reported by the terminal to the base station.

Optionally, the association relationship includes a first association relationship directly associated with the first serving cell and/or a second association relationship associated with a new candidate beam of the first serving cell reported by the terminal to the base station.

Optionally, when the first processor 500 selects a first-type serving cell and/or a second-type serving cell, from the serving cells that have the association relationship with the first serving cell, as the second serving cells, the first processor 500 is specifically configured to, sequentially traverse the serving cells that have an association relationship with the first serving cell; if the number of found first-type serving cells and/or second-type serving cells reaches a first preset number, then determine the first preset number of the first-type serving cells and/or second-type serving cells as the second serving cells; where the first preset number is greater than or equal to 1.

Optionally, when the first processor 500 sequentially traverses the serving cells that have an association relationship with the first serving cell, the first processor 500 is specifically configured to, according to priority orders of the serving cells that have an association relationship with the first serving cell, which are pre-defined or indicated by the base station, sequentially traverse the serving cells that have an association relationship with the first serving cell.

Optionally, when the first processor 500 selects a first-type serving cell, from the serving cells that have the association relationship with the first serving cell, as the second serving cells, the first processor 500 is specifically configured to, select serving cells belonging to the first-type serving cell from the serving cells that have an association relationship with the first serving cell;

select a second preset number of serving cells from the serving cells belonging to the first-type serving cell as the second serving cell; where the second preset number is greater than or equal to 1.

Optionally, when the first processor 500 selects a second-type serving cell, from the serving cells that have the association relationship with the first serving cell, as the second serving cells, the first processor 500 is specifically configured to, according to priority orders of the serving cells that have an association relationship with the first serving cell, which are pre-defined or indicated by the base station, sort the serving cells belonging to the first-type serving cell;

determine the second preset number of serving cells ranked first as the second serving cells.

Optionally, when the first processor 500 selects a second-type serving cell, from the serving cells that have the association relationship with the first serving cell, as the second serving cells, the first processor 500 is specifically configured to, select serving cells belonging to the second-type serving cell from the serving cells that have an association relationship with the first serving cell;

select a third preset number of serving cells from the serving cells belonging to the second-type serving cell as the second serving cell; where the third preset number is greater than or equal to 1.

Optionally, when the first processor 500 selects a third preset number of serving cells from the serving cells belonging to the second-type serving cell as the second serving cell, the first processor 500 is specifically configured to, according to priority orders of the serving cells that have an association relationship with the first serving cell, which are pre-defined or indicated by the base station, sort the serving cells belonging to the second-type serving cell;

determine the third preset number of serving cells ranked first as the second serving cells.

Optionally, when the first processor 500 selects a first-type serving cell and/or a second-type serving cell, from the serving cells that have the association relationship with the first serving cell, as the second serving cell, the first processor 500 is specifically configured to, select serving cells belonging to the first-type serving cell and serving cells belonging to the second-type serving cell, from the serving cells that have an association relationship with the first serving cell;

select a fourth preset number of serving cells, from the serving cells belonging to the first-type serving cell and the serving cells belonging to the second-type serving cell, as the second serving cell; where the fourth preset number is greater than or equal to 1.

Optionally, when the first processor 500 selects a fourth preset number of serving cells, from the serving cells belonging to the first-type serving cell and the serving cells belonging to the second-type serving cell, as the second serving cell, the first processor 500 is specifically configured to, according to priority orders of the serving cells that have an association relationship with the first serving cell, which are pre-defined or indicated by the base station, sort the serving cells belonging to the first-type serving cell and the serving cells belonging to the second-type serving cell;

determine the fourth preset number of serving cells ranked first as the second serving cells.

Optionally, the serving cell that has an association relationship with the first serving cell is configured by the base station or predefined.

Optionally, a pre-defined serving cell that has an association relationship with the first serving cell includes one or more of a serving cell currently in an active state, a serving cell where the terminal reports a beam failure event of the first serving cell to the base station, a serving cell where the terminal reports a new candidate beam of the first serving cell to the base station, a serving cell corresponding to a new candidate beam of the first serving cell reported by the terminal to the base station, and a serving cell that has a downlink in a frequency band where the first serving cell is located.

As shown in FIG. 5, a bus architecture may include any number of interconnected buses and bridges, and connects various circuits including one or more processors represented by the first processor 500 and memory represented by the first memory 520. The bus architecture may also connect various other circuits such as peripherals, voltage regulators and power management circuits, which is well known in the art. Therefore, a detailed description thereof is omitted herein. A bus interface provides interfaces. The first transceiver 510 may be multiple elements, i.e., including a transmitter and a receiver, to allow for communication with various other apparatuses on the transmission medium. The first processor 500 is responsible for managing the bus architecture and normal operation. The first memory 520 stores the data being used by the first processor 500 during operation.

Those skilled in the art can understand that all or part of the steps in the foregoing embodiments may be implemented by hardware, or by using a computer program to instruct related hardware. The computer program includes instructions for performing part or all of the steps of the foregoing method. The computer program may be stored in a readable storage medium, which may be any form of storage medium.

Sixth Embodiment

Figure 6:
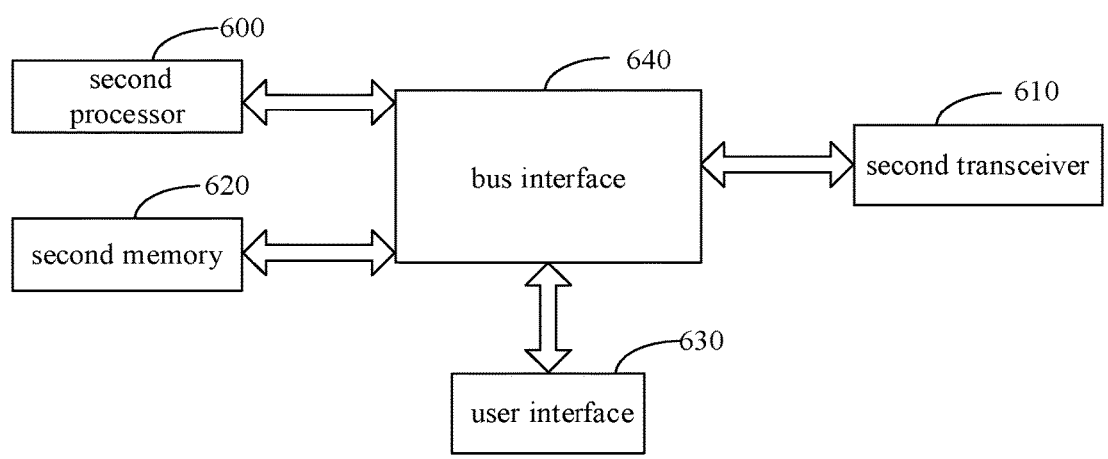
FIG. 6 is a schematic block diagram of a terminal according to a sixth embodiment of the present disclosure.

In order to better achieve the foregoing purpose, as shown in FIG. 6, one embodiment provides a terminal, including: a second processor 600, and a second memory 620 connected to the second processor 600 through a bus interface 640.

The second memory 620 is configured to store programs and data used by the second processor 600 when performing operations. When the second processor 600 calls and executes the programs and data stored in the second memory 620, the following process is executed.

A second transceiver 610 is connected to the bus interface 640, and is configured to receive and transmit data under control of the second processor 700.

Specifically, the second processor 600 is configured to, determine at least one serving cell, from serving cells that have an association relationship with a first serving cell, as a second serving cell;

monitor a beam failure recovery response for the first serving cell on the second serving cell.

Optionally, when the second processor 600 determines at least one serving cell, from serving cells that have an association relationship with a first serving cell, as a second serving cell, the second processor 600 is specifically configured to, select a first-type serving cell and/or a third-type serving cell, from the serving cells that have the association relationship with the first serving cell, as the second serving cell; or, take each serving cell that has an association relationship with the first serving cell as the second serving cell;

where the first-type serving cell is not in a beam failure recovery process; the third-type serving cell is in a beam failure recovery process, and the new candidate beam of the first serving cell reported by the terminal to the base station is not in failure beams of the third-type serving cell reported by the terminal to the base station and/or the terminal does not detect that the new candidate beam of the first serving cell reported by the terminal to the base station has a beam failure in the third-type serving cell.

Optionally, the association relationship includes a first association relationship directly associated with the first serving cell and/or a second association relationship associated with a new candidate beam of the first serving cell reported by the terminal to the base station.

Optionally, when the second processor 600 selects select a first-type serving cell and/or a third-type serving cell, from the serving cells that have the association relationship with the first serving cell, as the second serving cell, the second processor 600 is specifically configured to, sequentially traverse the serving cells that have an association relationship with the first serving cell; if the number of found first-type serving cells and/or third-type serving cells reaches a first preset number, then determine the first preset number of the first-type serving cells and/or third-type serving cells as the second serving cells; where the first preset number is greater than or equal to 1.

Optionally, when the second processor 600 sequentially traverses the serving cells that have an association relationship with the first serving cell, the second processor 600 is specifically configured to, according to priority orders of the serving cells that have an association relationship with the first serving cell, which are pre-defined or indicated by the base station, sequentially traverse the serving cells that have an association relationship with the first serving cell.

Optionally, when the second processor 600 selects a first-type serving cell, from the serving cells that have the association relationship with the first serving cell, as the second serving cell, the second processor 600 is specifically configured to, select serving cells belonging to the first-type serving cell from the serving cells that have an association relationship with the first serving cell;

select a second preset number of serving cells from the serving cells belonging to the first-type serving cell as the second serving cell; where the second preset number is greater than or equal to 1.

Optionally, when the second processor 600 selects a second preset number of serving cells from the serving cells belonging to the first-type serving cell as the second serving cell, the second processor 600 is specifically configured to, according to priority orders of the serving cells that have an association relationship with the first serving cell, which are pre-defined or indicated by the base station, sort the serving cells belonging to the first-type serving cell;

determine the second preset number of serving cells ranked first as the second serving cells.

Optionally, when the second processor 600 selects a third-type serving cell, from the serving cells that have the association relationship with the first serving cell, as the second serving cell, the second processor 600 is specifically configured to, select serving cells belonging to the third-type serving cell from the serving cells that have an association relationship with the first serving cell;

select a third preset number of serving cells from the serving cells belonging to the third-type serving cell as the second serving cell; where the third preset number is greater than or equal to 1.

Optionally, when the second processor 600 selects a third preset number of serving cells from the serving cells belonging to the third-type serving cell as the second serving cell, the second processor 600 is specifically configured to, according to priority orders of the serving cells that have an association relationship with the first serving cell, which are pre-defined or indicated by the base station, sort the serving cells belonging to the third-type serving cell;

determine the third preset number of serving cells ranked first as the second serving cells.

Optionally, when the second processor 600 selects a first-type serving cell and/or a third-type serving cell, from the serving cells that have the association relationship with the first serving cell, as the second serving cell, the second processor 600 is specifically configured to, select serving cells belonging to the first-type serving cell and serving cells belonging to the third-type serving cell, from the serving cells that have an association relationship with the first serving cell;

select a fourth preset number of serving cells, from the serving cells belonging to the first-type serving cell and the serving cells belonging to the third-type serving cell, as the second serving cell; where the fourth preset number is greater than or equal to 1.

Optionally, when the second processor 600 selects a fourth preset number of serving cells, from the serving cells belonging to the first-type serving cell and the serving cells belonging to the third-type serving cell, as the second serving cell, the second processor 600 is specifically configured to, according to priority orders of the serving cells that have an association relationship with the first serving cell, which are pre-defined or indicated by the base station, sort the serving cells belonging to the first-type serving cell and the serving cells belonging to the third-type serving cell;

determine the fourth preset number of serving cells ranked first as the second serving cells.

Optionally, the serving cell that has an association relationship with the first serving cell is configured by the base station or predefined.

Optionally, a pre-defined serving cell that has an association relationship with the first serving cell includes one or more of a serving cell currently in an active state, a serving cell where the terminal reports a beam failure event of the first serving cell to the base station, a serving cell where the terminal reports a new candidate beam of the first serving cell to the base station, a serving cell corresponding to a new candidate beam of the first serving cell reported by the terminal to the base station, and a serving cell that has a downlink in a frequency band where the first serving cell is located.

Optionally, when the second processor 600 monitors the beam failure recovery response for the first serving cell on the second serving cell, the second processor 600 is specifically configured to, periodically monitor the beam failure recovery response for the first serving cell on the second serving cell;

or, when the second processor 600 determines at least one serving cell, from serving cells that have an association relationship with a first serving cell, as a second serving cell, the second processor 600 is specifically configured to, according to a first preset period, determine at least one serving cell, from the serving cells that have an association relationship with the first serving cell, as the second serving cell;

when the second processor 600 monitors the beam failure recovery response for the first serving cell on the second serving cell, the second processor 600 is specifically configured to, according to a second preset period, monitor the beam failure recovery response for the first serving cell on the last determined second serving cell.

It should be noted that in FIG. 6, a bus architecture may include any number of interconnected buses and bridges, and connects various circuits including one or more processors represented by the second processor 600 and memory represented by the second memory 620. The bus architecture may also connect various other circuits such as peripherals, voltage regulators and power management circuits, which is well known in the art. Therefore, a detailed description thereof is omitted herein. A bus interface provides interfaces. The second transceiver 610 may be multiple elements, i.e., including a transmitter and a receiver, to allow for communication with various other apparatuses on the transmission medium. For different terminals, the user interface 630 may also be an interface capable of externally/internally connecting with the required devices, the required devices including but not being limited to a keypad, a display, a speaker, a microphone, and a joystick. The second processor 600 is responsible for managing the bus architecture and normal operation. The second memory 620 stores the data being used by the second processor 600 during operation.

Those skilled in the art can understand that all or part of the steps in the foregoing embodiments may be implemented by hardware, or by using a computer program to instruct related hardware. The computer program includes instructions for performing part or all of the steps of the foregoing method. The computer program may be stored in a readable storage medium, which may be any form of storage medium.

In addition, it should be noted that in the apparatus and method of the present disclosure, apparently, components or steps may be decomposed and/or recombined. The decomposition and/or recombination should be considered as an equivalent solution of the present disclosure. In addition, steps for performing the foregoing series of processing may be naturally performed in a sequence of description and in a time sequence, but do not need to be performed necessarily in the time sequence, and some steps may be performed in parallel or independently. A person of ordinary skill in the art can understand that all or any steps or components of the method and apparatus in the present disclosure may be implemented by hardware, firmware, software, or a combination thereof in any computing apparatus (including a processor, a storage medium, and the like) or a network of computing apparatuses. This can be implemented as long as a person of ordinary skill in the art applies basic programming skill after reading the specification of the present disclosure.

Therefore, an objective of the present disclosure may also be achieved by running a program or a group of programs on any computing apparatus. The computing apparatus may be a well-known general apparatus. Therefore, the objective of the present disclosure may also be achieved by merely providing a program product including program code for implementing the method or apparatus. To be specific, the program product also constitutes the present disclosure, and a storage medium storing the program product also constitutes the present disclosure. Apparently, the storage medium may be any well-known storage medium or any storage medium that will be developed in the future. It should also be noted that in the apparatus and method of the present disclosure, apparently, the components or steps may be decomposed and/or recombined. The decomposition and/or recombination should be considered as an equivalent solution of the present disclosure. In addition, steps for performing the foregoing series of processing may be naturally performed in a sequence of description and in a time sequence, but do not need to be performed necessarily in the time sequence. Some steps may be performed in parallel or independently.

One of ordinary skill in the art may learn that, taking into account various embodiments of the present disclosure, units and algorithm blocks described in each example may be implemented by electronic hardware, or in a combination of computer software and electronic hardware. Whether these functions are implemented by using hardware or software depends on specific application, and design constraints of the technical solution. A skilled person may adopt different methods to implement described functions of each specific application, but such implementation should not be considered to extend beyond the scope of the present disclosure.

One of ordinary skill in the art may clearly understand that, for convenient and concise of the description, specific work process of foregoing system, device and unit may refer to a corresponding process in method embodiments, which are not repeated here.

In the embodiments of the application, it should be understood that, the disclosed device and method may be implemented by using other methods. For example, device embodiments described above are only illustrative, e.g., division of the unit is only a logical division, there may be additional division methods during actual implementation. For example, multiple units or components may be combined, or integrated into another system. Alternatively, some features may be omitted, or not performed. From another point of view, the mutual coupling shown or discussed, or direct coupling, or communication connection may be through some interfaces. The indirect coupling, or communication connection among devices or units may be electronic, mechanical, or in other form.

Units described as separate components may be, or may be not physically separated. Components, displayed as units, may be or may be not a physical unit, which may be located in one place, or may be distributed to multiple network units. Some units, or all the units may be selected to implement the objectives of the solution in the embodiment, based on actual requirements.

In addition, in various embodiments of the present disclosure, each functional unit may be integrated into one processing unit. Alternatively, each unit may exist physically alone. Still alternatively, two or more units may be integrated into one unit.

When the functions are implemented in the form of a software functional unit, and sold or used as an independent product, such software functional unit may be stored in a computer readable storage medium. On the basis of such understanding, essence of technical solution in the present disclosure, or a part thereof contributing to the existing technology, or just a part of the technical solution may be demonstrated with a software product. The computer software product is stored in a storage medium, which includes several instructions to enable a computer device (which may be a Personal Computer (PC), a server, or a network device, and so on) to execute all the blocks, or some blocks in a method of each embodiment in the present disclosure. The foregoing storage medium includes a U disk, a mobile hard disk, a Read-Only Memory (ROM), a Random Access Memory (RAM), a disk, or a Compact Disk (CD), or various mediums which may store program codes.

Persons having ordinary skill in the art can understand that all or part of the processes in the foregoing method embodiments can be implemented by controlling relevant hardware through a computer program. The program may be stored in a computer readable storage medium. The program is executed to perform procedures of the foregoing method embodiments. The storage medium may be a magnetic disk, an optical disc, a read-only memory (ROM), or a random access memory (RAM), etc.

It can be understood that these embodiments described in the present disclosure may be implemented with hardware, software, firmware, middleware, microcode, or a combination thereof. As for hardware implementation, the processing unit can be implemented in one or multiple Application-Specific Integrated Circuits (ASIC), Digital Signal Processors (DSP), Digital Signal Processing Devices (DSPD), Programmable Logic Devices (PLD), Field-Programmable Gate Arrays (FPGA), general-purpose processors, controllers, micro-controllers, micro-processors, and other electronic units or combinations thereof used to perform the functions described in the present disclosure.

For software implementations, the technologies described in the present disclosure can be implemented through the modules that perform the functions described in the present disclosure (such as procedures, functions, and so on). Software codes can be stored in the storage and executed by the processor. The storage can be implemented in or outside of the processor.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. A beam failure recovery response transmission method, performed by a base station, comprising:

transmitting, to a terminal, a beam failure recovery response for a first serving cell on a second serving cell;

wherein the second serving cell includes a serving cell corresponding to a new candidate beam of the first serving cell reported by the terminal to the base station;

wherein before transmitting, to a terminal, a beam failure recovery response for a first serving cell on a second serving cell, the method further includes: determining, by the base station, at least one serving cell, from serving cells that have an association relationship with a first serving cell, as the second serving cell; wherein the determining, by the base station, at least one serving cell, from the serving cells that have the association relationship with the first serving cell, as the second serving cell, includes: selecting a first-type serving cell and/or a second-type serving cell, from the serving cells that have the association relationship with the first serving cell, as the second serving cell; wherein the first-type serving cell is not in a beam failure recovery process; the second-type serving cell is in a beam failure recovery process, and a new candidate beam of the first serving cell reported by a terminal to a base station is not in failure beams of the second-type serving cell reported by the terminal to the base station;

wherein the selecting the first-type serving cell and/or the second-type serving cell, from the serving cells that have the association relationship with the first serving cell, as the second serving cell, includes one of the following:

(i) sequentially traversing the serving cells that have the association relationship with the first serving cell; if the number of found first-type serving cells and/or second-type serving cells reaches a first preset number, then determining the first preset number of the first-type serving cells and/or second-type serving cells as the second serving cells; wherein the first preset number is greater than or equal to 1;

wherein the sequentially traversing the serving cells that have the association relationship with the first serving cell, includes:

according to priority orders of the serving cells that have the association relationship with the first serving cell, which are pre-defined or indicated by the base station, sequentially traversing the serving cells that have the association relationship with the first serving cell;

(ii) selecting serving cells belonging to the first-type serving cell from the serving cells that have the association relationship with the first serving cell; and selecting a second preset number of serving cells from the serving cells belonging to the first-type serving cell as the second serving cell; wherein the second preset number is greater than or equal to 1; or, wherein the selecting the second-type serving cell, from the serving cells that have the association relationship with the first serving cell, as the second serving cell, includes: selecting serving cells belonging to the second-type serving cell from the serving cells that have the association relationship with the first serving cell; and selecting a third preset number of serving cells from the serving cells belonging to the second-type serving cell as the second serving cell; wherein the third preset number is greater than or equal to 1; or, wherein the selecting the first-type serving cell and/or the second-type serving cell, from the serving cells that have the association relationship with the first serving cell, as the second serving cell, includes: selecting serving cells belonging to the first-type serving cell and serving cells belonging to the second-type serving cell, from the serving cells that have the association relationship with the first serving cell; and selecting a fourth preset number of serving cells, from the serving cells belonging to the first-type serving cell and the serving cells belonging to the second-type serving cell, as the second serving cell; wherein the fourth preset number is greater than or equal to 1;

wherein the selecting the second preset number of serving cells from the serving cells belonging to the first-type serving cell as the second serving cell, includes:

according to priority orders of the serving cells that have the association relationship with the first serving cell, which are pre-defined or indicated by the base station, sorting the serving cells belonging to the first-type serving cell; and determining the second preset number of serving cells ranked first as the second serving cells; or, wherein the selecting the third preset number of serving cells from the serving cells belonging to the second-type serving cell as the second serving cell, includes: according to priority orders of the serving cells that have the association relationship with the first serving cell, which are pre-defined or indicated by the base station, sorting the serving cells belonging to the second-type serving cell; and determining the third preset number of serving cells ranked first as the second serving cells; or, wherein the selecting the fourth preset number of serving cells, from the serving cells belonging to the first-type serving cell and the serving cells belonging to the second-type serving cell, as the second serving cell, includes: according to priority orders of the serving cells that have the association relationship with the first serving cell, which are pre-defined or indicated by the base station, sorting the serving cells belonging to the first-type serving cell and the serving cells belonging to the second-type serving cell; and, determining the fourth preset number of serving cells ranked first as the second serving cells.

2. The method according to claim 1, wherein the association relationship includes a first association relationship directly associated with the first serving cell and/or a second association relationship associated with the new candidate beam of the first serving cell reported by the terminal to the base station.

3. A beam failure recovery response monitoring method, comprising:

monitoring a beam failure recovery response for a first serving cell on a second serving cell;

wherein the second serving cell includes a serving cell corresponding to a new candidate beam of the first serving cell reported by a terminal to a base station;

wherein the monitoring the beam failure recovery response for the first serving cell on the second serving cell, includes: periodically monitoring the beam failure recovery response for the first serving cell on the second serving cell; wherein the monitoring the beam failure recovery response for the first serving cell on the second serving cell, includes: according to a second preset period, monitoring the beam failure recovery response for the first serving cell on a last determined second serving cell; or. wherein the determining at least one serving cell, from the serving cells that have the association relationship with the first serving cell, as the second serving cell, includes: according to a first preset period, determining at least one serving cell, from the serving cells that have the association relationship with the first serving cell, as the second serving cell; or, wherein before monitoring a beam failure recovery response for a first serving cell on a second serving cell, the method further includes one of the following:

(i) determining at least one serving cell, from serving cells that have an association relationship with a first serving cell, as the second serving cell; wherein the determining at least one serving cell, from the serving cells that have the association relationship with the first serving cell, as the second serving cell, includes: selecting a first-type serving cell and/or a third-type serving cell, from serving cells that have the association relationship with the first serving cell, as the second serving cell; wherein the first-type serving cell is not in a beam failure recovery process; the third-type serving cell is in a beam failure recovery process, and a new candidate beam of the first serving cell reported by a terminal to a base station is not in failure beams of the third-type serving cell reported by the terminal to the base station and/or the terminal does not detect that the new candidate beam of the first serving cell reported by the terminal to the base station has a beam failure in the third-type serving cell;

wherein the selecting the first-type serving cell and/or the third-type serving cell, from the serving cells that have the association relationship with the first serving cell, as the second serving cell, includes: sequentially traversing the serving cells that have the association relationship with the first serving cell; if the number of found first-type serving cells and/or third-type serving cells reaches a first preset number, then determining the first preset number of the first-type serving cells and/or third-type serving cells as the second serving cells; wherein the first preset number is greater than or equal to 1;

wherein the sequentially traversing the serving cells that have the association relationship with the first serving cell, includes:

according to priority orders of the serving cells that have the association relationship with the first serving cell, which are pre-defined or indicated by the base station, sequentially traversing the serving cells that have the association relationship with the first serving cell;

(ii) determining at least one serving cell, from serving cells that have an association relationship with a first serving cell, as the second serving cell; wherein the determining at least one serving cell, from the serving cells that have the association relationship with the first serving cell, as the second serving cell, includes: selecting a first-type serving cell and/or a third-type serving cell, from serving cells that have the association relationship with the first serving cell, as the second serving cell; wherein the first-type serving cell is not in a beam failure recovery process; the third-type serving cell is in a beam failure recovery process, and a new candidate beam of the first serving cell reported by a terminal to a base station is not in failure beams of the third-type serving cell reported by the terminal to the base station and/or the terminal does not detect that the new candidate beam of the first serving cell reported by the terminal to the base station has a beam failure in the third-type serving cell;

wherein the selecting the first-type serving cell, from the serving cells that have the association relationship with the first serving cell, as the second serving cell, includes: selecting serving cells belonging to the first-type serving cell from the serving cells that have the association relationship with the first serving cell; and selecting a second preset number of serving cells from the serving cells belonging to the first-type serving cell as the second serving cell; wherein the second preset number is greater than or equal to 1; or, wherein the selecting the third-type serving cell, from the serving cells that have the association relationship with the first serving cell, as the second serving cell, includes: selecting serving cells belonging to the third-type serving cell from the serving cells that have the association relationship with the first serving cell; and selecting a third preset number of serving cells from the serving cells belonging to the third-type serving cell as the second serving cell; wherein the third preset number is greater than or equal to 1; or, wherein the selecting the first-type serving cell and/or the third-type serving cell, from the serving cells that have the association relationship with the first serving cell, as the second serving cell, includes: selecting serving cells belonging to the first-type serving cell and serving cells belonging to the third-type serving cell, from the serving cells that have the association relationship with the first serving cell; and selecting a fourth preset number of serving cells, from the serving cells belonging to the first-type serving cell and the serving cells belonging to the third-type serving cell, as the second serving cell; wherein the fourth preset number is greater than or equal to 1;

wherein the selecting the second preset number of serving cells from the serving cells belonging to the first-type serving cell as the second serving cell, includes:

according to priority orders of the serving cells that have the association relationship with the first serving cell, which are pre-defined or indicated by the base station, sorting the serving cells belonging to the first-type serving cell; and determining the second preset number of serving cells ranked first as the second serving cells; or, wherein the selecting the third preset number of serving cells from the serving cells belonging to the third-type serving cell as the second serving cell, includes: according to priority orders of the serving cells that have the association relationship with the first serving cell, which are pre-defined or indicated by the base station, sorting the serving cells belonging to the third-type serving cell; and determining the third preset number of serving cells ranked first as the second serving cells; or, wherein the selecting the fourth preset number of serving cells, from the serving cells belonging to the first-type serving cell and the serving cells belonging to the third-type serving cell, as the second serving cell, includes: according to priority orders of the serving cells that have the association relationship with the first serving cell, which are pre-defined or indicated by the base station, sorting the serving cells belonging to the first-type serving cell and the serving cells belonging to the third-type serving cell; and determining the fourth preset number of serving cells ranked first as the second serving cells.

4. The method according to claim 3, wherein the association relationship includes a first association relationship directly associated with the first serving cell and/or a second association relationship associated with the new candidate beam of the first serving cell reported by the terminal to the base station.

5. A base station, comprising: a first transceiver, a first memory, a first processor, and a program stored on the first memory and executable by the first processor;

wherein the first processor is configured to,
transmit, to a terminal, a beam failure recovery response for a first serving cell on a second serving cell;
wherein the second serving cell includes a serving cell corresponding to a new candidate beam of the first serving cell reported by the terminal to the base station;
wherein before transmitting, to a terminal, a beam failure recovery response for a first serving cell on a second serving cell, the first processor is further configured to: determine at least one serving cell, from serving cells that have an association relationship with a first serving cell, as the second serving cell; wherein the determining at least one serving cell, from the serving cells that have the association relationship with the first serving cell, as the second serving cell, includes: selecting a first-type serving cell and/or a second-type serving cell, from the serving cells that have the association relationship with the first serving cell, as the second serving cell; wherein the first-type serving cell is not in a beam failure recovery process; the second-type serving cell is in a beam failure recovery process, and a new candidate beam of the first serving cell reported by a terminal to a base station is not in failure beams of the second-type serving cell reported by the terminal to the base station;
wherein when selecting the first-type serving cell and/or the second-type serving cell, from the serving cells that have the association relationship with the first serving cell, as the second serving cell, the first processor is configured to perform one of the following:
(i) sequentially traversing the serving cells that have the association relationship with the first serving cell; if the number of found first-type serving cells and/or second-type serving cells reaches a first preset number, then determining the first preset number of the first-type serving cells and/or second-type serving cells as the second serving cells; wherein the first preset number is greater than or equal to 1;
wherein the sequentially traversing the serving cells that have the association relationship with the first serving cell, includes:
according to priority orders of the serving cells that have the association relationship with the first serving cell, which are pre-defined or indicated by the base station, sequentially traversing the serving cells that have the association relationship with the first serving cell;
(ii) selecting serving cells belonging to the first-type serving cell from the serving cells that have the association relationship with the first serving cell; and selecting a second preset number of serving cells from the serving cells belonging to the first-type serving cell as the second serving cell; wherein the second preset number is greater than or equal to 1; or, wherein the selecting the second-type serving cell, from the serving cells that have the association relationship with the first serving cell, as the second serving cell, includes: selecting serving cells belonging to the second-type serving cell from the serving cells that have the association relationship with the first serving cell; and selecting a third preset number of serving cells from the serving cells belonging to the second-type serving cell as the second serving cell; wherein the third preset number is greater than or equal to 1; or, wherein the selecting the first-type serving cell and/or the second-type serving cell, from the serving cells that have the association relationship with the first serving cell, as the second serving cell, includes:
selecting serving cells belonging to the first-type serving cell and serving cells belonging to the second-type serving cell, from the serving cells that have the association relationship with the first serving cell; and selecting a fourth preset number of serving cells, from the serving cells belonging to the first-type serving cell and the serving cells belonging to the second-type serving cell, as the second serving cell; wherein the fourth preset number is greater than or equal to 1;
wherein the selecting the second preset number of serving cells from the serving cells belonging to the first-type serving cell as the second serving cell, includes:
according to priority orders of the serving cells that have the association relationship with the first serving cell, which are pre-defined or indicated by the base station, sorting the serving cells belonging to the first-type serving cell; and determining the second preset number of serving cells ranked first as the second serving cells; or, wherein the selecting the third preset number of serving cells from the serving cells belonging to the second-type serving cell as the second serving cell, includes: according to priority orders of the serving cells that have the association relationship with the first serving cell, which are pre-defined or indicated by the base station, sorting the serving cells belonging to the second-type serving cell; and determining the third preset number of serving cells ranked first as the second serving cells; or, wherein the selecting the fourth preset number of serving cells, from the serving cells belonging to the first-type serving cell and the serving cells belonging to the second-type serving cell, as the second serving cell, includes: according to priority orders of the serving cells that have the association relationship with the first serving cell, which are pre-defined or indicated by the base station, sorting the serving cells belonging to the first-type serving cell and the serving cells belonging to the second-type serving cell; and, determining the fourth preset number of serving cells ranked first as the second serving cells.

6. A terminal for performing the method according to claim 3, comprising: a second transceiver, a second memory, a second processor, and a program stored on the second memory and executable by the second processor;
wherein the second processor is configured to, monitor a beam failure recovery response for a first serving cell on a second serving cell;
wherein the second serving cell includes a serving cell corresponding to a new candidate beam of the first serving cell reported by a terminal to a base station.

* * * * *